US009489498B2

(12) United States Patent
Cha et al.

(10) Patent No.: US 9,489,498 B2
(45) Date of Patent: Nov. 8, 2016

(54) DIGITAL RIGHTS MANAGEMENT USING TRUSTED PROCESSING TECHNIQUES

(71) Applicant: InterDigital Technology Corporation, Wilmington, DE (US)

(72) Inventors: Inhyok Cha, Seoul (KR); Yogendra C. Shah, Exton, PA (US); Amit Singhal, King of Prussia, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 14/319,659

(22) Filed: Jun. 30, 2014

(65) Prior Publication Data

US 2014/0310528 A1   Oct. 16, 2014

Related U.S. Application Data

(62) Division of application No. 11/744,304, filed on May 4, 2007, now Pat. No. 8,769,298.

(60) Provisional application No. 60/798,152, filed on May 5, 2006.

(51) Int. Cl.
*G06F 21/10* (2013.01)
*G06F 21/57* (2013.01)
(Continued)

(52) U.S. Cl.
CPC .............. *G06F 21/10* (2013.01); *G06F 21/57* (2013.01); *H04L 9/3247* (2013.01); *H04L 63/12* (2013.01); *H04L 63/20* (2013.01)

(58) Field of Classification Search
USPC ................................................ 713/176, 187
See application file for complete search history.

(56) References Cited

U.S. PATENT DOCUMENTS 6,931,545 B1   8/2005   Ta et al.
6,996,710 B1   2/2006   Ellison et al.
(Continued)

FOREIGN PATENT DOCUMENTS

AU   200734 7234 B2   8/2008
CN       1728039      2/2006
(Continued)

OTHER PUBLICATIONS

Trusted Computing Group, TCG Specification Architecture Overview Specification Revision 1.2, Apr. 28, 2004, TCG, pp. 1-54.*
(Continued)

*Primary Examiner* — Jeffrey Pwu
*Assistant Examiner* — Samuel Ambaye
(74) *Attorney, Agent, or Firm* — Baker & Hostetler LLP

(57) ABSTRACT

The present invention discloses several methods to strengthen the integrity of entities, messages, and processing related to content distribution as defined by the Open Mobile Alliance (OMA) Digital Rights Management (DRM). The methods use techniques related to the Trusted Computing Group (TCG) specifications. A first embodiment uses TCG techniques to verify platform and DRM software integrity or trustworthiness, both with and without modifications to the DRM rights object acquisition protocol (ROAP) and DRM content format specifications. A second embodiment uses TCG techniques to strengthen the integrity of ROAP messages, constituent information, and processing without changing the existing ROAP protocol. A third embodiment uses TCG techniques to strengthen the integrity of the ROAP messages, information, and processing with some changes to the existing ROAP protocol.

22 Claims, 8 Drawing Sheets

(51) Int. Cl.
H04L 29/06 (2006.01)
H04L 9/32 (2006.01)

(56) References Cited

U.S. PATENT DOCUMENTS

| | | | |
|---|---|---|---|
| 7,346,780 | B2 | 3/2008 | Sinha et al. |
| 7,398,557 | B2 | 7/2008 | De Jong |
| 7,406,603 | B1 | 7/2008 | MacKay et al. |
| 2004/0153646 | A1 | 8/2004 | Smith |
| 2004/0230797 | A1 | 11/2004 | Ofek et al. |
| 2005/0033987 | A1 | 2/2005 | Yan et al. |
| 2005/0172127 | A1 | 8/2005 | Hartung et al. |
| 2005/0246282 | A1 | 11/2005 | Naslund et al. |
| 2005/0251857 | A1 | 11/2005 | Schunter et al. |
| 2005/0262571 | A1 | 11/2005 | Zimmer |
| 2006/0015753 | A1 | 1/2006 | Drehmel et al. |
| 2006/0031164 | A1* | 2/2006 | Kim .................. G06F 21/10 705/51 |
| 2006/0236369 | A1* | 10/2006 | Covington et al. ........... 726/1 |
| 2007/0079381 | A1 | 4/2007 | Hartung et al. |
| 2007/0130221 | A1 | 6/2007 | Abdo et al. |
| 2007/0168293 | A1* | 7/2007 | Medvinsky ................. 705/57 |
| 2008/0022129 | A1 | 1/2008 | Durham et al. |

FOREIGN PATENT DOCUMENTS

| | | |
|---|---|---|
| EP | 1056010 | 11/2000 |
| EP | 1 632 829 | 3/2006 |
| EP | 1 635 545 | 3/2006 |
| EP | 1265396 | 8/2006 |
| GB | 2412822 | 10/2005 |
| JP | 563-107667 | 5/1988 |
| JP | 2003-510713 | 3/2003 |
| JP | 2006-40279 | 2/2006 |
| WO | WO 01/23980 | 4/2001 |
| WO | WO 02/086725 | 10/2002 |
| WO | WO 2007/086697 | 8/2007 |
| WO | WO 2008/100264 A3 | 8/2008 |

OTHER PUBLICATIONS

"TCG Infrastructure Working Group Reference Architecture for Interoperability", Specification Version 1.0, Revision 1, Jun. 16, 2005, 66 pages.
Eimear Gallery, "Implementation of MPWG Requirements for DRM and SIMLock/ME Persnalisation", Vodafone Group, (Mar. 1, 2005).
England et al., "A Trusted Open Platform", IEEE Computer Society, (Jul. 2003).
English Translation of Japanese Patent Application No. 2009-509765: Rejection dated Oct. 11, 2011, 5 pages.
Housley et al., "Internet X. 509 Public Key Infrastructure Certificate and Certificate Revocation List (CRL) Profile", Network Working Group, RFC 3280, (Apr. 2002).
Housley et al., "Internet X. 509.Public Key Infrastructure Certificate and Certificate Revocation List (CRL) Profile", Network Working Group, RFC 3280, (Apr. 2002).
Intel Corporation, "Intel Wireless Trusted Platform: Security for Mobile Devices", White Paper, (2004).
Myers et al., "X. 509 Internet Public Key Infrastructure Online Certificate Status Protocol-OCSP", Network Working Group, RFC 2560, (Jun. 1999).
Ohta et al., "Trusted Device Framework for Secure Handset Functionality Extension", IPSJ SIG Technical Report, Feb. 23, 2005, vol. 2005, No. 16, 49-56.
Open Mobile Alliance Ltd., "DRM Architecture", Candidate Version 2.0, OMA-DRM-ARCH-V2_0-20040820-C, (Aug. 20, 2004).
Open Mobile Alliance Ltd., "DRM Content Format", Candidate Version 2.0, OMA-TS-DRM-DFC-V2_0-20050614-C, (Jun. 14, 2005).
Open Mobile Alliance Ltd., DRM Rights Expression Language', Candidate Version 2.0, OMA-TS-DRM•REL-V2_0-20050614-C, (Jun. 14, 2005).
Open Mobile Alliance Ltd., DRM Rights Expression Language•, Candidate Version 2.0, OMA-TS-DRM-REL-V2_0-20050614-C, (Jun. 14, 2005).
Open Mobile Alliance Ltd., DRM Specification, Candidate Version 2.0, OMA-TS-DRM-DRM-V2_0-20050614-C, (Jun. 14, 2005).
Open Mobile Alliance Ltd., "OMA DRM Requirements", Candidate Version 2.0, OMA-RD_DRM-V2_0-20040716-C, (Jul. 16, 2004).
Open Mobile Alliance Ltd., OMA DRM Requirements, Candidate Version 2.0, OMA-RD_DRM-V2_0-20040716-C, (Jul. 16, 2004).
Open Mobile Alliance Ltd., DRM Architecture•, Candidate Version 2.0, OMA-DRM-ARCH-V2_0-20040820-C, (Aug. 20, 2004).
Open Mobile Alliance Ltd., DRM Content Format, Candidate Version 2.0, OM-TS-DAM-DFC-V2_0-20050614-C, (Jun. 14, 2005).
Open Mobile Alliance Ltd., 'DRM Specification', Approved Version 2.0, OMA-TS-DRM-DRM-V2_0-20060303-A, (Mar. 3, 2006).
Open Mobile Alliance Ltd., 'DRM Specification', Candidate Version 2.0, OMA-TS-DRM-DRM-V2_0-0050614-C, (Jun. 14, 2005).
Reid et al., "DRM, Trusted Computing and Operating System Architecture", 4.2 Integrity Measurement and Reporting, Proceedings of the Third Australian Information Security Workshop, 2005, vol. 44, 127-136.
RSA Security Inc., "PKCS #1 V2.1: RSA Cryptography Standard", RSA Laboratories, (Jun. 14, 2002).
RSA Security Inc., 'PKCS #1 V2.1: RSA Cryptography Standard', RSA Laboratories, (Jun. 14, 2002).
Sian I Pearson, "Trusted Computing Platforms", TCPA Technology in Context, Chapter 3 Key Components of Trusted Platform Technology, pp. 57-91, Chapter 6 Integrity Recording, Reporting, and Secure Boot, pp. 137-143, Chapter 7 Protected Storage, pp. 145-157, Prentice Hall, (2002).
Siani Pearson, Trusted Computing Platforms, TCPA Technology in Context, Chapter 3 Key Components of Trusted Platform Technology, pp. 57-91, Chapter 6 Integrity Recording, Reporting, and Secure Boot, pp. 137-143, Chapter 7 Protected Storage, pp. 145-157, Prentice Hall, (2002).
Trusted Computing Group, TCG Specification Architecture Overview, Specification Revision 1.2, (Apr. 28, 2004).
Trusted Computing Group, "Mobile Phone Work Group", Use Case Scenarios- Phase 2 V2.5.1.
Trusted Computing Group, 'Mobile Phone Work Group', Use Case Scenarios- Phase 2V2.5.1.
Trusted Computing Group, 'TCG Specification Architecture Overview', Specification Revision 1.2, (Apr. 28, 2004).
Yoshihama et al., WS.Attestation: Efficient and Fine-Grained Remote Attestation on Web Services, IEEE International Conference on Web Services, pp. 743-750 (Jul. 11, 2005).
Yu Zheng et al., "Secure DRM Scheme for Future Mobile Networks Based on Trusted Mobile Platform", Wireless Communications, Networking and Mobile Computing Proceeding. 2005 International Conference, pp. 1164-1167, Sep. 23-26, 2005.
Zheng et al., "Secure DRM Scheme for Future Mobile Networks Based on Trusted Mobile Platform, "International Conference on Wireless Communications, Networking, and Mobile Computing, vol. 2, pp. 1164-1167 (Sep. 23-26, 2005).
European Application No. 15175049.4: Extended European Search Report dated Dec. 15, 2016.
Japanese Application No. 2014-162568: Notice of Rejection dated Jan. 26, 2016.

* cited by examiner

DIGITAL RIGHTS MANAGEMENT USING TRUSTED PROCESSING TECHNIQUES

CROSS REFERENCE TO RELATED APPLICATION

This application is a divisional of U.S. patent application Ser. No. 11/744,304, filed May 4, 2007, which claims the benefit of U.S. Provisional Patent Application No. 60/798,152 filed May 5, 2006, both of which are incorporated by reference as if fully set forth herein.

FIELD OF INVENTION

The present invention generally relates to digital rights management (DRM) methods in wireless communication networks. More particularly, the present invention provides methods for enhancing security, integrity, and trustworthiness in systems operating in accordance with the Open Mobile Alliance (OMA) DRM specifications.

BACKGROUND

The OMA DRM is a DRM system specified by the OMA, a consortium of mobile phone and device manufacturers and mobile service providers. The scheme is implemented on many mobile phones and is intended to be used by mobile content providers to add DRM to their products and services. Two versions of the OMA DRM have been released: OMA DRM 1.0 and OMA DRM 2.0.

OMA DRM 1.0 addressed schemes for basic management of digital rights for content objects. As such, it did not provide strong protection for either the content object or the rights object. OMA DRM 1.0 specifies three methods of delivery: Forward Lock (which prevents the user from forwarding content to other users or devices), Combined Delivery (a combined rights object and media object), and Separate Delivery (separate rights object and media object). The OMA DRM 1.0 was designed to handle small-sized media objects such as ring tones or wallpapers for phones.

OMA DRM 2.0 improves and extends the OMA DRM 1.0 delivery mechanism. A device compliant with OMA DRM 2.0 has an individual certificate based on a DRM public key infrastructure (PKI), i.e., each device has a public key, a corresponding private key, and a certificate verifying this fact. Each rights object (RO) is protected for both confidentiality (by encryption) and integrity (by digital signatures). The use of PKI, encryption, and integrity checking strengthens the security of the OMA DRM 2.0 system compared to that of the OMA DRM 1.0 system.

OMA DRM 2.0 also specifies a set of protocols that together are called the Rights Object Acquisition Protocol (ROAP) that comprises various sub-protocols related to mutual authentication and registration between a device and a rights issuer (RI), requesting ROs, response to delivery of ROs or refusal to deliver ROs, and joining and leaving of domains by the device.

The following are some of the main entities defined in the OMA DRM:

Actor—An actor is an external entity that carries out use cases.

Backup/Remote Storage—Transferring ROs and Content Objects (COs) to another location with the intention of transferring them back to the original device.

Combined Delivery—A OMA DRM 1.0 method for delivering protected content and the RO. The RO and the protected content are delivered together in a single entity, the DRM message.

Confidentiality—The property that information is not made available or disclosed to unauthorized individuals, entities, or processes.

Composite Object—A CO containing one or more media objects by means of inclusion.

Connected Device—A device capable of directly connecting to an RI using an appropriate protocol over an appropriate wide area transport/network layer interface.

Content—One or more media objects.

Content Issuer (CI)—The entity making content available to the DRM agent.

Content Provider—An entity that is either a CI or an RI.

Device—A user equipment with a DRM agent. It can be either a connected device or an unconnected device, but this distinction is contextual and variable in nature, since a connected device can become an unconnected device when it loses its capability to directly connect to an RI.

Device Revocation—The process of an RI indicating that a device is no longer trusted to acquire ROs.

Device RO—An RO dedicated for a particular device by means of the device's public key.

Domain—A set of devices, which are able to share domain ROs. Devices in a domain share a domain key. A domain is defined and managed by an RI.

Domain Identifier—A unique string identifier of the domain key.

Domain Key—A 128 bit symmetric cipher key.

DRM Agent—The entity in the device that manages permissions for media objects on the device.

DRM Content—Media objects that are consumed according to a set of permissions in an RO.

DRM Time—A secure, non-user changeable time source. The DRM time is in the UTC time format.

Integrity—The property that data has not been altered or destroyed in an unauthorized manner.

Join Domain—The process of an RI including a device in a domain.

Leave (De-Join) Domain—The process of an RI excluding a non-revoked device from a domain.

Media Object—A digital work or a composite object.

Network Service Provider—The entity providing network connectivity for a mobile device.

Permission—Actual usages or activities allowed by the RI over DRM content.

Play—To create a transient, perceivable rendition of a resource.

Protected Content—Media objects that are consumed according to a set of permissions in an RO.

Restore—Transferring the protected content and/or ROs from an external location back to the device from which they were backed up.

Revoke—Process of declaring a device or RI certificate as invalid.

Rights Issuer (RI)—An entity that issues ROs to OMA DRM conformant devices.

RI Context—Information that was negotiated with a given RI during the 4-pass Registration Protocol such as RI ID, RI certificate chain, version, algorithms, and other information. An RI Context is necessary for a device to successfully participate in all the protocols of the ROAP suite, except the Registration Protocol.

Rights Object (RO)—A collection of permissions and other attributes which are linked to protected content.

Rights Object Acquisition Protocol (ROAP)—A protocol that enables devices to request and acquire ROs from an RI.

ROAP Trigger—An extensible markup language (XML) document including a URL that, when received by the device, initiates the ROAP.

Stateless Rights—ROs for which the device does not have to maintain state information.

Stateful Rights—ROs for which the device has to explicitly maintain state information, so that the constraints and permissions expressed in the RO can be enforced correctly. An RO containing any of the following constraints or permissions is considered Stateful Rights: <interval>, <count>, <timed-count>, <datetime>, <accumulated> or <export>.

Super-Distribution—A mechanism that (1) allows a user to distribute protected content to other devices through potentially insecure channels and (2) enables the user of that device to obtain an RO for the super-distributed protected content.

Unconnected Device—A device that is capable of connecting to an RI via a connected device using an appropriate protocol over a local connectivity technology, e.g., OBEX over IrDA (object exchange over infrared), Bluetooth, or Universal Serial Bus (USB). An unconnected device may support DRM Time.

User—The human user of a device. The user does not necessarily own the device.

FIG. 1 is an overview of the existing OMA DRM 2.0 functional architecture 100. The architecture 100 consists of a DRM system 102, a content provider 104, and a user 106. The DRM system 102 includes a CI 110, an RI 112, DRM agents 114, a network store 116, and removable media 118. The CI 110 distributes protected content 122 and the RI 112 distributes an RO 124. The DRM agents 114 redistribute the protected content 122.

The CI 110 is an entity that delivers DRM content 122. The OMA DRM defines the format of the DRM content 122 to be delivered to DRM agents 114 and the way that the DRM content 122 can be transported from the CI 110 to the DRM agent 114 using different transport mechanisms. The CI 110 may do the actual packaging of the DRM content 122 itself or it may receive pre-packaged content from some other source.

The RI 112 is an entity that assigns permissions and constraints to the DRM content 122 and generates ROs 124. An RO 124 is an XML document expressing permissions and constraints associated with the DRM content 122. ROs 124 govern how the DRM content 122 may be used; the DRM content 122 cannot be used without an associated RO 124 and may only be used as specified by its associated RO(s). DRM content could be associated with more than one RO if, for example, the RO has a time expiration (e.g., 10 days), and after the time expiration a new RO would be needed to access the content.

The DRM agent 114 is a logical entity that is responsible for managing point-of-consumption enforcement of the DRM content 122. The DRM agent 114 embodies a trusted component of a device, and is responsible for enforcing the permissions and constraints for the DRM content 122 on the device, controlling access to the DRM content on the device (which can only be accessed through the DRM agent 114), and so on.

The DRM content 122 is packaged to protect it from unauthorized access before it is delivered. The CI 110 delivers the DRM content 122, and the RI 112 generates the RO 124. The CI 110 and the RI 112 embody logical roles, rather than physical entities, in the system 102. For example, in one deployment, content owners may pre-package DRM content, which is then distributed by a content distributor acting as both CI and RI.

An RO 124 governs how the DRM content 122 may be used. DRM content 122 cannot be used without an associated RO 124, and may only be used according to the permissions and constraints specified in the RO 124. The OMA DRM makes a logical separation of DRM content from ROs. DRM content and ROs may be requested separately or together, and they may be delivered separately or at the same time. When they are delivered at the same time, they are typically both provided by the CI 110, with the RO and the content embedded in a DRM Content Format (DCF).

An RO 124 is cryptographically bound to a specific DRM agent 114 by a set of keys, so only that specific DRM agent 114 can access it. The DRM content 122 can only be accessed with a valid RO 124, so the content 122 can be freely distributed or super-distributed.

The OMA DRM 2.0 allows one RO to be bound to a group of DRM agents. Such a group is called a domain. DRM content and ROs distributed to a domain may be shared and accessed offline by all DRM agents belonging to that domain. For example, a user may purchase DRM content for use on both her phone and her PDA.

The OMA DRM specifications define the format and the protection mechanism for DRM content (or the DCF), the format (rights expression language (REL)) and the protection mechanism for the RO, and the security model for management of encryption keys. The OMA DRM specifications also define how the DRM content and the ROs may be transported to devices using a range of transport mechanisms, including pull (HTTP pull, OMA download), push (WAP push, MMS), and streaming. However, the OMA DRM specifications do not address any interaction between network entities, e.g., between the CI 110 and the RI 112.

The following is a non-exhaustive list of the use cases covered by the OMA DRM 2.0 specifications.

1. Basic Pull Model

A user selects content to download by browsing to a Web site, and confirms the terms of the purchase. The CI 110 identifies and protects the content 122, i.e., packages it. The content 122 is encrypted using the content encryption key (CEK). The device capabilities can be detected using advertised MIME-type support, etc. The RI 112 generates an RO 124 for the content 122 and the target DRM agent 114. The RO 124 includes the permissions for the content transaction and the CEK. Lastly, the RO 124 is cryptographically protected by encryption (using an RO encryption key, or REK) and digital signatures, and is bound only to the target DRM agent 114. The DRM content 122 and the protected RO 124 are then delivered to the DRM agent 114.

2. Push of DRM Content

An alternative distribution model is to push the content directly to a device using Multimedia Messaging Service (MMS), WAP Push, or a similar method, without a preceding discovery process. There are two variations on this use case.

2A. Content Push

The CI 110 and/or the RI 112 may have certain prior knowledge of a user and a particular DRM agent 114, so that the content 122 and an RO 124 can be formatted and packaged for delivery.

2B. Push-Initiated Pull

In this case, the CI 110 and/or the RI 112 may have no prior knowledge about the user or their DRM agent 114, but may still wish to deliver content, e.g., to allow the user to preview the content 122 to entice them to purchase the content. Instead of pushing the DRM content 122 directly to a user, a link to the content or a link to the preview of the content can be sent. Following the link will take the user to a specific location and then the procedure continues as in the basic pull model.

3. Streaming of DRM Content

Both the basic pull and the push use cases assume that the content is packaged and delivered in its entirety. Alternatively, the content may be packetized and delivered as a stream. In this case, the stream itself is protected (encrypted). The exact format of the encryption has been left out of the scope of OMA DRM, and can be chosen from existing encryption standards. The streams may be protected with encryption schemes which are different from those specified by OMA for download, to address possible packet loss, etc. After the stream is encrypted, though, access to the stream can be controlled through the same procedure as described earlier for discrete content. An RO is generated, the stream encryption key is put in the RO just like a CEK would be, and the RO is then cryptographically bound to a DRM agent.

4. Domains

Domains are an optional feature and may not be supported by all RIs. Domains expand the basic model of the OMA DRM 2.0 where the ROs and the CEK are bound to a specific DRM agent 114, and allow an RI 112 to bind rights and CEKs to a group of DRM agents instead of just a single DRM agent. Users may then share the DRM content 122 off-line between all DRM agents belonging to the same domain. An RI 112 may use the domain concept to provide new services, such as enabling users to access DRM content 122 from several devices that they own or provide support for unconnected devices where users purchase the DRM content and rights via one device (e.g., a PC) for later use on another device (e.g., a portable player).

5. Back-Up

The DRM content 122 can be stored on removable media 118, in a network store 116, or in some other form of storage. The DRM content 122 is stored in encrypted form and can only be accessed by a particular target DRM agent 114 using an associated RO 124. ROs 124 can be stored for backup purposes if the RO only contains stateless permissions. The security model ensures that the RO 124 is protected and can only be accessed by the intended DRM agent 114, even if the RO 124 is stored off-device. Some permissions require maintenance of state by the DRM agent 114, e.g., a limited number of plays. Such ROs cannot be stored off-device, as this might result in loss of the state information.

6. Super-Distribution

The DRM content 122 can be copied and transferred to other DRM agents 114, e.g., a user sending the DRM content 122 to a friend. The friend, in order to access the content 122, is taken to the RI 112 via a link in the DRM content package to acquire an RO 124.

7. Export (to Non-OMA DRM Systems)

The DRM content 122 may be exported to other DRM systems, for use on devices that are not OMA DRM compliant, but support some other DRM mechanism. The OMA DRM architecture allows RIs 112 to, if they wish, express permission for DRM agents 114 to perform conversions to specific other DRM systems, possibly as specified by the other DRM system. The RI 112 may limit the export only to specific external DRM systems.

8. Support of Unconnected Devices

The OMA DRM enables a connected device to act as an intermediary to assist an unconnected device to purchase and download content 122 and ROs 124. A user, for example, may have an OMA DRM compliant portable device (an unconnected device) that has no network connectivity, and an OMA DRM compliant mobile device (a connected device) that has network connectivity. After using the connected device to browse and purchase the DRM content 122 and downloading the DRM content 122 to the connected device, the user then may wish to play the DRM content 122 on the unconnected device. In this case, the DRM agent 114 on the connected device requests and downloads a domain RO 124 from the RI 112.

The DRM agent 114 on the connected device then embeds the domain RO 124 in the DCF. The DCF can then be transferred to the unconnected device using an appropriate protocol over a local connectivity technology, e.g., Bluetooth or USB. Both the connected device and unconnected device must be OMA DRM compliant to support this functionality. Also, the unconnected device must belong to the same domain as the connected device.

Security and Trust

The following is an overview of the OMA DRM 2.0 security and trust measures. In general, any DRM solution needs to meet two security requirements: (1) the protected content must only be accessed by properly authenticated and authorized DRM agents; and (2) permissions on the protected content must be honored by all DRM agents. Enforcement of the permissions and constraints associated with the DRM content are the main concern of the security and trust measures of any DRM scheme. Unauthorized access to DRM content beyond what is stipulated by the associated RO and creation of illegal copies and redistribution of DRM content constitute the main threats to any DRM system.

The OMA DRM system provides the means for the secure distribution and management of protected content in the OMA environment and meets the requirements specified above. The OMA DRM enforces the use and protection of the content and the ROs at the point of consumption by using a DRM agent that ensures protected use of content under the constraints of the ROs.

The basic steps for distributing DRM content can be summarized as follows:

1. Content packaging. Content is packaged in a secure content container (DCF). The DRM content is encrypted with a symmetric content encryption key (CEK). The content can be pre-packaged, i.e., content packaging does not have to happen on the fly. The same CEK is not used for all instances of a piece of content, although this is not a requirement in the OMA DRM.

2. DRM agent authentication. All DRM agents have a unique private/public key pair and a certificate. The certificate includes additional information such as device maker, device type, software version, serial numbers, etc. This allows the Cis and the RIs to securely authenticate a DRM agent.

3. RO generation. The RO contains the CEK, which ensures that the DRM content cannot be used without an associated RO. ROs are made up of permissions (e.g., play, display, and execute) and constraints (e.g., play for a month, display ten times). ROs may also include constraints that require a certain user to be present (e.g., determined by a user identity) when the content is accessed. These permissions and constraints, along with other information embodied in the RO (e.g., copyright information), may be presented to the user.

4. RO protection. Before delivering the RO, sensitive portions of the RO (such as the CEK) are encrypted with a rights encryption key (REK), and the RO is then cryptographically bound to the target DRM agent. This ensures that only the target DRM agent can access the RO, the CEK, and the DRM content. In addition, the RI digitally signs the RO. The RO also governs access to the DRM content by including the CEK. The OMA DRM Rights Expression Language (REL) specifies the syntax (XML) and semantics of permissions and constraints governing the use of the DRM content. An RO has its own MIME content type.

5. Delivery. The RO and the DCF can now be delivered to the target DRM agent. Since both items are inherently secure, they can be delivered using any transport mechanism (e.g., HTTP/WSP, WAP Push, MMS). The RO and the DCF can be delivered together, e.g., in a MIME multipart message or can be delivered separately.

The OMA DRM trust model for the ROs is based on the public key infrastructure (PKI), whereby there are groups of principals, verifiers and one or more authentication authorities recognized and trusted by both. A single entity can play both as a principal and a verifier depending on the needs of the context and solutions chosen. The PKI enables a verifier to authenticate the identity and other attributes of a principal when they communicate over an open, unsecured network. In such a system, typically, the verifier does not have to maintain any sensitive information about the principals it interacts with, for the purposes of authentication. In addition, the Certification Authority (CA) is not directly involved in transactions between principal and the verifier. An RI trusts a DRM agent to behave correctly if the DRM agent's certificate is verifiable by the RI and has not been revoked. Similarly, a DRM agent trusts an RI to behave correctly if the RI's certificate is verifiable by the DRM agent and has not been revoked.

The primary entities of the PKI as applied to the OMA DRM are the CAs, the devices, and the RIs. The authentication and key transfer protocols of the OMA DRM require the RI to be able to authenticate the device and the device to be able to authenticate the RI. Such mutual authentication is accomplished by the ROAP.

In addition, devices are assumed to be provisioned (either at manufacturing time or later) with device public and private keys and associated certificates signed by an appropriate CA. Based on the certificate preferences expressed by the RI, the device has to provide an appropriate certificate. Devices are required to store the private keys in local storage with integrity and confidentiality protection.

The RIs are also provided with public keys, private keys, and certificates signed by a CA. The certificate chain (a chain of multiple certificates including the certificate of the public key owner signed by one CA and zero or more additional certificates of CAs signed by other CAs) is presented to the device at the time of the authentication protocol for validation of the certificate chain of trust.

It is noted that multiple CAs may exist in the DRM system. The ROAP protocol requires that the CA signing the RI certificates runs an Online Certification Status Protocol (OCSP) responder for use during the execution of the protocol. The CAs are also required to define the appropriate certificate policies to govern the use of the issued certificates.

The following describes the main aspects of OMA DRM security.

1. Confidentiality, which ensures that data is not accessible by an unauthorized party. As stated above, the protected content must only be accessible by properly authenticated and authorized DRM agents. To achieve this goal, protected content is encrypted. Encryption keys are unique to each media object, and ROs carry the encryption keys wrapped in keys only accessible by the intended recipients.

2. Authentication, which is the process by which a party identifies itself to another party. In the OMA DRM, mutual DRM agent and RI authentication is achieved in the 4-pass Registration Protocol, the 2-pass RO Acquisition Protocol, and the 2-pass Join Domain protocol. Depending on the protocol used and the message sent, authentication is achieved either through digital signatures on nonces or on time stamps. The 1-pass RO Acquisition Protocol achieves RI authentication through the digital signature on a time stamp. It does not authenticate the DRM agent to the RI, but due to the protected content being wrapped with the recipient's public key, authentication is done indirectly through key binding. The 2-pass Leave Domain Protocol authenticates the DRM agent to the RI through the digital signature on a time stamp. It does not authenticate the RI to the DRM agent. RIs are required to authenticate themselves to the DRM agent during delivery of ROs. This provides some level of assurance about the authenticity of the RI.

3. Data Integrity Protection ensures the ability to detect unauthorized modification of data. In the OMA DRM, data integrity protection, when applicable, is achieved through digital signatures on ROAP messages and ROs.

4. Key Confirmation ensures the recipient of a message containing a protected key that the message sender knows the key value. In the DRM context, this property protects against unauthorized re-issuance of ROs from one RI by another. In the OMA DRM system, key confirmation is achieved through a medium access control (MAC) over the protected key and the sending party's identity by using parts of the protected key as the MAC key.

The DRM agent has to be trusted by the RI, both in terms of correct behavior and in terms of a secure implementation. In the OMA DRM, each DRM agent is provisioned with a unique key pair and an associated certificate, identifying the DRM agent and certifying the binding between the agent and this key pair. This allows RIs to securely authenticate the DRM agent using standard PKI procedures.

The information in the certificate enables the RI to apply a policy based on its business rules, the value of its content, etc. For example, an RI may trust certain manufacturers, or it may keep an updated list of DRM agents that are known to be trusted or not trusted according to some criteria defined by the RI.

The DRM Content Format (DCF) is a secure content package for encrypted content, with its own MIME content type. In addition to the encrypted content, it contains additional information such as content description (original content type, vendor, version, etc.), RI uniform resource identifier (URI) (a location where an RO may be obtained), and so on. This additional information is not encrypted and may be presented to the user before an RO is retrieved. The CEK needed to unlock the DRM content inside a DCF is contained within the RO. Thus, it is not possible to access DRM content without the RO, and the DRM content can only be used as specified in the RO. The OMA DRM includes a mechanism allowing a DRM agent to verify the integrity of a DCF, protecting against modification of the content by an unauthorized entity.

The OMA DRM system assumes the presence of DRM time in the DRM agent. Since users are not able to change the DRM time, a mechanism is defined by which the DRM time can be synchronized with the time held by an OCSP responder. Some constraints (e.g., absolute time constraints), as well as some aspects of the delivery protocol for ROs, rely on the DRM agent having a secure time source. DRM time in the context of the OMA DRM specifications means an accurate time as well as a time value that is not changeable by users. The OMA DRM specifications provide mechanisms for the DRM time to be synchronized when necessary, e.g., if the DRM time is lost after a prolonged power failure. Some limited-capability unconnected devices may not support a real time clock and hence may not support DRM time. Connected devices, however, must support DRM time.

The OMA DRM protects against RO replay protection attacks. An example of an RO replay attack is where an intermediary intercepts an RO with a limited number of plays during delivery to the DRM agent. When the rights expire on the DRM agent, the intercepted RO might be delivered again (replayed) from the intermediary. The OMA DRM prevents this and similar attacks from occurring.

The OMA DRM system provides application-layer security through the use of the security mechanisms listed above. Hence, it does not rely on, or assume, transport layer security.

The ROAP plays a central part in the OMA DRM 2.0 in allowing secure, authentication-based exchange of information regarding ROs. The ROAP is the common name for a suite of DRM security protocols between an RI and a DRM agent in a device. The protocol suite contains several sub-protocols:

1. The 4-pass protocol for registering a device with an RI, as shown in FIG. 2.
2. The 2-pass RO acquisition protocol includes the request and delivery of an RO, as shown in FIG. 3.
3. The 1-pass RO acquisition protocol relates to the delivery of an RO from an RI to a device (e.g., messaging/push), as shown in FIG. 4.
4. The 2-pass join domain protocol for a device to join a domain, as shown in FIG. 5.
5. The 2-pass leave domain protocol for a device to leave a domain, as shown in FIG. 6.

FIG. 2 is a flow diagram the 4-pass registration protocol 200. The protocol 200 utilizes a device 202, an RI 204, and an OCSP responder 206. The device 202 initiates (possibly upon receipt of a ROAP trigger) the contact with the RI 204 by sending a Device Hello message (step 210), which contains information such as the device ID (a hash of a device's certificate that the RI 204 can later check with the OCSP responder 206) and other information. Table 1 illustrates the main components in the Device Hello message. None of the information in the Device Hello message is integrity protected, i.e., there is no signature for the message.

TABLE 1

Format of the Device Hello message

| Parameter | Mandatory or Optional | Notes |
|---|---|---|
| Version | Mandatory | <major.minor> representation of the highest ROAP version number supported by ROAP. This value is 1.0 for OMA DRM v2.0. The device has to support all versions including and prior to the version specified. |
| Device ID | Mandatory | Currently, the only ID defined is the SHA-1 hash of the device's public key information, as it appears in the certificate (i.e., the complete Distinguished Encoding Rules (DER)-encoded SubjectPublicKeyInfo component in the device certificate). If the device holds multiple keys, it may select one or more of these public keys and send the corresponding device IDs. |
| Supported Algorithms | Optional | Identifies the cryptographic algorithms (hash, MAC, signature, key transport, key wrap) identified by common URIs. All devices and RIs should support the algorithms specified in the OMA DRM 2.0. |
| Extensions | Optional | Certificate Caching, to indicate to the RI that the device has the capability to store information in the RI context whether the RI has stored the device certificate information or not. The actual storage indicator is done by the Peer Key Identifier extension for the device's public key indication. |

The RI 204, in response to the Device Hello message (step 210), sends an RI Hello message to the device 202 (step 212), which contains information such as the RI's certificate credentials (in the form of an RI ID), some session related (anti-reply-purpose) nonces and session numbers, and other optional information such as the information on the trust chain about the device that the RI 204 recognizes. Table 2 illustrates the format of the RI Hello message. It is noted that none of the information in the RI Hello message is integrity protected.

TABLE 2

Format of the RI Hello message

ROAP-RI Hello

| Parameter | Status = "Success" | Status not "Success" | Notes |
|---|---|---|---|
| Status | Mandatory | Mandatory | Indicates whether the Device Hello message handling was successful or not. |
| Session ID | Mandatory | — | Protocol session ID set by the RI. |
| Selected Version | Mandatory | — | Minimum of (device suggested ROAP version, highest RI supported ROAP version). |
| RI ID | Mandatory | — | The only currently defined ID is the hash of the RI's public key information, as appearing in the RI's certificate. If the RI holds multiple keys, the RI must select only one key. |
| Selected Algorithm | Optional | — | Cryptographic algorithms to use in subsequent ROAP interactions. |
| RI Nonce | Mandatory | — | A random nonce sent by the RI. |
| Trusted device Authorities | Optional | — | List of device trust anchors recognized by the RI. It is not sent if the RI already has a device certificate or otherwise can trust the device. |

TABLE 2-continued

Format of the RI Hello message

| | ROAP-RI Hello | | |
|---|---|---|---|
| Parameter | Status = "Success" | Status not "Success" | Notes |
| Server Info | Optional | — | <=512 byte server-specific information that the device later must return unchanged in the Registration Request message. The device must not try to interpret this information. |
| Extensions | Optional | — | Peer Key Identifier, Certificate Caching, Device Details: by including this, the RI requests the device to return device-specific information (manufacturer, model, etc.) in a subsequent Registration Request message. |

Upon successful verification of the information contained in the RI Hello message, the device 202 sends a Registration Request message (step 214) that includes mandatory information such as the request time, session ID, and a signature and optional information such as a certificate chain, trusted RI authority anchor, extensions, etc. Table 3 illustrates the format of the Registration Request message. The Registration Request message contains, at its tail end, a digital signature of all the messages exchanged between the device 202 and the RI 204 up to the Signature field in the Registration Request message, i.e., the entire Device Hello message, the entire RI Hello message, and the fields of the Registration Request message up to (and excluding) the Signature field. This digital signature is made using the device's private key. Including the digital signature provides some integrity protection of the associated ROAP messages.

TABLE 3

Format of the Registration Request message

| Parameter | Registration Request | Notes |
|---|---|---|
| Session ID | Mandatory | Same as the session ID in the RI Hello message. If not the same, then the RI terminates the registration protocol. |
| Device Nonce | Mandatory | A nonce chosen by the device. |
| Request Time | Mandatory | The current DRM time as measured by the device. |
| Certificate Chain | Optional | A certificate chain includes the device's certificate but not the root certificate. The certificate chain is present unless the RI Hello message contained the Peer Key Identifier extension and its value identified the key in the device's current certificate. If the RI indicated trust anchor preferences in the RI Hello message, the device must select a device certificate and chain which chains back to one of the trust anchors indicated by the RI. |
| Trusted RI Authorities | Optional | List of RI trust anchors recognized by the device. If empty, it indicates that the RI is free to choose any certificate. |
| Server Info | Optional | Only (must be) present if a Server Info parameter was present in the RI Hello message. If present, this field must be the same as in the RI Hello message. |
| Extensions | Optional | Peer Key Identifier; No OCSP Response; OCSP Responder Key Identifier; Device Details (manufacturer, model, version). |
| Signature | Mandatory | An SHA-1 hash of data sent so far in the protocol, excluding this Signature element. Made using the device's private key. |

Unless the device 202 indicates, via information in the Extensions, that OCSP verification is not necessary or supported, the RI 204 sends an OCSP Request message to the OCSP Responder 206 (step 216) to request verification of the information supplied to the RI 204 by the device 202. The OCSP Responder 206 looks up the information in the request message to attempt to verify the information and returns an OCSP Response message (step 218) containing the results of the request.

The RI 204 sends a Registration Response message to the device 202 (step 220), which include an indication of whether the registration was successful or unsuccessful and other information. Table 4 illustrates the format of the Registration Response message. The Registration Response message contains, at its tail end, an SHA-1 hash of the Registration Request message and the Registration Response message (up to and excluding the Signature field). This digital signature is made using the RI's private key. Including the digital signature provides some integrity protection of the associated ROAP messages. It is noted that while the SHA-1 hash is used for the digital signature, any suitable algorithm for applying the digital signature could be used.

TABLE 4

Format of the Registration Response message

Registration Response

| Parameter | Status = "Success" | Status not "Success" | Notes |
|---|---|---|---|
| Status | Mandatory | Mandatory | Indicates whether the Device Hello message handling was successful or not. |
| Session ID | Mandatory | — | The protocol session ID set by the RI. |
| Selected Version | Mandatory | — | The minimum of (device suggested ROAP version, highest RI supported ROAP version). |
| RI ID | Mandatory | — | The only currently defined ID is the hash of the RI's public key information, as appearing in the RI's certificate. If the RI holds multiple keys, the RI must select only one key. |
| Selected Algorithm | Mandatory | — | Cryptographic algorithms to use in subsequent ROAP interactions. |
| RI Nonce | Mandatory | — | A random nonce sent by the RI. |
| Trusted device Authorities | Optional | — | List of device trust anchors recognized by the RI. It is not sent if the RI already has a device certificate or otherwise can trust the device. |
| Server Info | Optional | — | <=512 byte server-specific information that the device later must return unchanged in the Registration Request message. The device must not try to interpret this information. |
| Extensions | Optional | — | Peer Key Identifier, Certificate Caching, Device Details: by including this, the RI requests the device to return device-specific information (manufacturer, model) in the subsequent Registration Request message. |
| Signature | Mandatory | — | SHA-1 has of the Registration Request message and the Registration Response message (excluding the Signature field), using the RI's private key. |

FIG. 3 is a flow diagram of the 2-pass RO Acquisition Protocol 300. The protocol 300 utilizes the device 202 and the RI 204, and operates after the 4-pass Registration Protocol 200 has been completed and the device 202 has received a valid certificate chain about the RI 204. The protocol 300 is used by the device 202 to request an RO from the RI 204. The device 202 sends an RO Request message to the RI 204 to request the RO (step 310). Table 5 shows the format of the RO Request message. The RO Request message contains a digital signature of the message (excluding the signature field).

The RI 204, in response to the request message, sends an RO Response message to the device 202 (step 312). The RO response message includes an RO or includes an indication that an RO will not be sent.

Table 6 shows the format of the RO response message. The RO Response message, in successful state case, contains a digital signature that is an SHA-1 hash of the RO Request message and the RO Response message excluding the Signature field.

TABLE 5

Format of the RO Request message

| Parameter | ROAP-RO Request Mandatory/ Optional | Notes |
|---|---|---|
| Device ID | M | Identifies the requesting device. |
| Domain ID | O | When present, identifies the domain. |
| RI ID | M | Authorizing RI ID. Same value as in the Registration Response message. |
| Device Nonce | M | A nonce chosen by device. |
| Request Time | M | The current DRM Time, as seen by the device. |
| RO Info | M | IDs of the requested RO(s), and also an optional hash of the DCF if the device possesses the DCF. |
| Certificate Chain | O | Sent unless the RI context indicates that the device has the necessary certificate information. Must include the device's certificate. |
| Extensions | O | Peer Key Identifier; No OCSP Response; OCSP Responder Key Identifier; Transaction ID |
| Signature | M | An SHA-1 hash of the RO Request message without the Signature element. |

TABLE 6

Format of the RO Response message

| Parameter | 2-Pass Success | 2-Pass not Success | Notes |
|---|---|---|---|
| Status | M | M | Indicates if the request was handled successfully or not. |
| Device ID | M | — | Identifies the requesting device, in the same way as in the Device Hello message. This value must be the same as in RO Request message. Must terminate if not. |
| RI ID | M | — | Identifies the RI and must equal the RI ID in the RO Request message. |
| Device Nonce | M | — | Must have the same value as in the RO Request message. |
| Protected ROs | M | — | ROs in which sensitive information (such as CEKs) are encrypted. |
| Certificate Chain | O | — | Same as in the Registration Response message. |
| OCSP Response | O | — | Complete set of OCSP responses for the RI's certificate chain. |
| Extensions | O | — | Transaction Identifier that allows the RI to provide the device with information for tracking transactions. |
| Signature | M | — | An SHA-1 hash of the RO Request message and the RO Response message (without this Signature field) using the RI's private key. |

FIG. 4 is a flow diagram of the 1-pass RO Acquisition Protocol 400. The protocol 400 utilizes the device 202 and the RI 204. In the protocol 400, the RI 204 unilaterally sends, without request by the device 202, an RO response message to the device 202 (step 410) including the RO. The protocol 400 applies to the push use cases, for example. Table 7 shows the format of the RO Response message.

TABLE 7

Format of the RO Response message

| Parameter | 1-Pass | Notes |
|---|---|---|
| Status | M | Indicates if the request was handled successfully or not. |
| Device ID | M | Identifies the requesting device, in the same way as in the Device Hello message. This value must be the same as in the RO Request message. Must terminate if not. |
| RI ID | M | Identifies the RI and must equal the stored RI ID. |
| Device Nonce | — | Must have same value as in the RO Request message. |
| Protected ROs | M | ROs in which sensitive information (such as CEKs) are encrypted. |
| Certificate Chain | O | Same as in the Registration Response message. |
| OCSP Response | M | Complete set of OCSP responses for the RI's certificate chain. |
| Extensions | O | Transaction Identifier that allows RI to provide the device with information for tracking transactions. |
| Signature | M | An SHA-1 hash of the RO Response message without this Signature field. The RI's private key is used to generate this Signature. |

FIG. 5 is a flow diagram of the 2-pass Join Domain Protocol 500. The protocol 500 utilizes the device 202 and the RI 204. When the device 202 wants to join a domain, the device 202 sends a Join Domain Request message to the RI 204 (step 510). The RI 204 evaluates the request and sends a Join Domain Response message to the device 202 (step 512). Table 8 shows the format of the Join Domain Request message and Table 9 shows the format of the Join Domain Response message.

TABLE 8

Format of the Join Domain Request Message

| Parameter | Mandatory or Optional | Notes |
|---|---|---|
| Device ID | M | Identifies the requesting device. This value must be the same as the stored value from the Registration Response message. |
| RI ID | M | Identifies the RI and must equal the stored RI ID from the Registration Response message. |
| Device Nonce | M | Nonce chosen by the device. |
| Request Time | M | Current DRM Time, as seen by the device. Unconnected Devices that do not support DRM Time MUST use the value "Undefined" here. |
| Domain Identifier | M | Identifies the Domain the device wishes to join. |
| Certificate Chain | O | This parameter is sent unless Certificate Caching is indicated in the RI Context with this RI. When present, the parameter value shall be as described for the Certificate Chain parameter in the Registration Response message. |
| Extensions | O | Includes extensions Peer Key Identifier, No OCSP Response, OCSP Responder Key Identifier, and Hash Chain Support. |
| Signature | M | An SHA-1 hash of the Join Domain Request message (without this Signature field) using the device's private key. |

TABLE 9

Format of the Join Domain Response Message

| Parameter | Status = Success | Status is NOT Success | Notes |
|---|---|---|---|
| Status | M | M | Indicates if the request was handled successfully or not. |

TABLE 9-continued

Format of the Join Domain Response Message

| Parameter | Status = Success | Status is NOT Success | Notes |
|---|---|---|---|
| Device ID | M | — | Identifies the requesting device. The value returned here must be the same as in Join Domain Request message that triggered this response. |
| RI ID | M | — | The value returned here must equal the RI ID sent by the device in the preceding Join Domain Request message. |
| Device Nonce | M | — | Must have the same value as in the preceding Join Domain Request message. |
| Domain Info | M | — | This parameter carries Domain keys (encrypted using Device's public key) as well as information about the maximum lifetime of the Domain. Devices may use a shorter lifetime than suggested by the RI. |
| Certificate Chain | O | — | This parameter MUST be present unless a preceding ROAP Join Domain Request message contained the Peer Key Identifier extension, the extension was not ignored by the RI, and its value identified the RI's current key. When present, the value of a Certificate Chain parameter shall be as described for the Certificate Chain parameter of the Registration Response message. |
| OCSP Response | O | — | A complete set of valid OCSP responses for the RI's certificate chain. |
| Extensions | O | — | Currently only one extension is defined for the Join Domain Response message. It is Hash Chain Support. When this extension is present it indicates that the RI is using the technique of generation Domain Keys through hash chains described in the Domain Section. The RI MUST NOT include this extension in the Join Domain Response unless the same extension was received in the preceding Join Domain Request. |
| Signature | M | — | An SHA-1 hash of the Join Domain Response message excluding the signature field itself. |

FIG. 6 is a flow diagram of the 2-pass Leave Domain Protocol 600. The protocol 600 utilizes the device 202 and the RI 204. When the device 202 wants to leave a domain, the device 202 sends a Leave Domain Request message to the RI 204 (step 610). The RI 204 evaluates the request and sends a Leave Domain Response message to the device 202 (step 612). Table 10 shows the format of the Leave Domain Request message and Table 11 shows the format of the Leave Domain Response message.

TABLE 10

Format of the Leave Domain Request Message

| Parameter | Mandatory or Optional | Notes |
|---|---|---|
| Device ID | M | Identifies the requesting device. This value must be the stored value from the Registration Response message. |
| RI ID | M | Identifies the RI and must equal stored RI ID from the Registration Response message. |
| Device Nonce | M | Nonce chosen by the device. |
| Request Time | M | Current DRM Time, as seen by the device. Unconnected Devices that do not support DRM Time MUST use the value "Undefined" here. |
| Domain Identifier | M | Identifies the Domain the device wishes to leave. |
| Certificate Chain | O | This parameter is sent unless Certificate Caching is indicated in the RI Context with this RI. When present, the parameter value shall be as described for the Certificate Chain parameter in the Registration Response message. |
| Extensions | O | The Not a Domain Member extension is currently defined for Leave Domain Request message. Presence of this extension indicates to the RI that the device does not consider itself a member of this Domain (even though it is sending a request for the RI to remove it from the Domain). This could happen, for example, if the device already has left the Domain, but receives a new trigger to leave it (perhaps because the RI never received the previous ROAP Leave Domain Request message). This extension MUST be included in the request if the device is not a member of the identified Domain. |
| Signature | M | An SHA-1 hash of the Leave Domain Request message (without this Signature field) using the device's private key. |

TABLE 11

Format of the Leave Domain Response Message

| Parameter | Status = Success | Status is NOT Success | Notes |
|---|---|---|---|
| Status | M | M | Indicates if the request was handled successfully or not. |
| Device Nonce | M | — | Must have the same value as in the preceding Leave Domain Request message. |
| Domain Identifier | M | — | The domain from which the RI removed the device. |
| Extensions | O | — | No extensions are currently defined for Leave Domain Response message. |

All of the protocols included in the ROAP suite except the 1-pass RO Acquisition Protocol may be initiated using a ROAP trigger. The device 202 may also initiate the protocols unilaterally as a result of user interactions. The RI 204 generates and sends the ROAP trigger to the device 202 to trigger a ROAP protocol exchange. Alternatively, the RI 204 may delegate ROAP trigger generation to other systems by providing the necessary information (such as RO identifiers and domain identifiers) to these systems. A ROAP trigger (whether generated directly or indirectly by the RI 204) may also be transmitted to the device 202 by other systems (e.g., by a CI).

When the device 202 receives the ROAP trigger, it initiates the ROAP protocol exchange as soon as possible. Appropriate user consent must have been obtained prior to initiating any ROAP protocols as a result of receiving a ROAP trigger. Since the ROAP comprises several protocols, the ROAP trigger includes an indication of the actual protocol (e.g., Registration, RO Acquisition, Join Domain, or Leave Domain) to be started by the device 202.

The ROAP messages and how the messages are handled by the protocols provide not only the ROs and their associated processing, but also security functions surrounding the ROs in the OMA DRM 2.0. More specifically, the following security and trust aspects are addressed by the ROAP protocols:

1. Mutual authentication between the RI and the device;
2. Countering replay attacks by using nonces in various messages;
3. Protecting the integrity of the ROAP messages or parts of the ROAP messages; and
4. Verification of secure DRM Time in the ROAP messages or parts of the ROAP messages.

Trusted Computing Techniques

Recently, trusted computing techniques have appeared in the literature and in products, mostly under the technical umbrella of the Trusted Computing Group (TCG). The TCG technologies provide methods whereby computing entities can establish trustworthiness for themselves and for other devices by way of using of a trust chain, so that processing or computing on such devices can be:

1. Assessed for the trustworthiness of the platform and various hardware (HW) and software (SW) components;
2. Validated only when the appropriate trust level is established and can be validated for itself and for others upon external requests; and
3. External parties can perform assessments and decisions on the exchange of information and processing with other devices and is based on the manifested trust levels of such target devices.

The TCG defines a core processing module called the Trusted Processing Module (TPM) that has the following features:

1. Physical protection of the module and its interfaces;
2. Protected volatile and non-volatile storage spaces;
3. Protected cryptographic functions inside the module that can perform encryption and digital signing;
4. Use of Platform Configuration Registers (PCR) that consecutively capture the "state" of the platform and its SW components by hash extending;
5. Existence of device specific and secure Endorsement Keys (EK), based on a PKI that serves as the root of the authentication of the device but not in direct ways. The EK is never exposed outside, but its aliases, called the Attestation Identity Keys (AIKs), are used to sign the platform's integrity measurement values; and
6. Use of "sealing" of data, in conjunction with PCR values signed by AIKs, in memory "blobs", so that data can be accessed or extracted only when platform or SW integrity (as measured and verified by the matching PCR values from the TPM and from the sealed memory blob) is verified.

Trusted computing techniques were inspected, especially in the context of mobile phone devices, for possible application in securing the DRM application on such mobile devices. Methods previously proposed to secure the DRM application by use of TCG techniques included certain methods that use the procedure of TPM sealing and the memory blobs to securely store the DRM-related data after ROAP protocol processing using TCG keys, in the TPM and in storage areas with key protection.

However, the existing prior art does not explicitly address nor address in an orderly way how to establish and use "trust" on the platform and/or the DRM software. Nor does the prior art address specific techniques to secure the integrity in the ROAP messages, to strengthen the integrity processing in OMA DRM 2.0 systems. The present invention includes new techniques for such purposes.

The current OMA DRM 2.0 specification provides strong security methods based on PKI involving the CA, the RIs, and the device. However, there are vulnerabilities related to the security and integrity of the platforms, SW, agents, and messages both within the OMA DRM 2.0 specification itself and as related to the non-specified implementation of the devices and RIs that are OMA DRM 2.0 compliant.

The OMA DRM specification has acknowledged the various threats and vulnerabilities that any device or RI could face, even when they are conforming to the OMA DRM 2.0 specification. These vulnerabilities include:

1. Entity Compromise, where an attacker may attempt to compromise an entity of the DRM system, physically or otherwise. Types of entity compromise attacks include compromising the DRM agent on the device and the DRM SW in the RI. The consequences of entity compromises include disclosure of private keys, domain keys, RO encryption keys, content encryption keys, and protected content, as well as the loss of integrity protection of the DRM agent's replay cache, for example, and/or the loss of protection of the rights stored internally in the DRM agent. Further, losses of DRM time could also occur. The effects on a PKI of a compromised CA or OCSP Responder is discussed in references such as IETF RFC3280.

The OMA DRM system relies on certificate revocation to minimize the damage caused by a compromised entity. DRM agents and RIs must always verify that the entity they are communicating with has not been compromised, by checking the entity's certificate status. An entity compromise attack can take place in both "forward" and "reversed" ways. A forward compromise attack is on the DRM entities (the RI, the DRM agent, the CI, the CA, or the OCSP responder), leading to unauthorized behavior. A reversed compromise attack neutralizes or weakens a DRM agent's security, integrity settings, and configurations.

2. Message Removal, whereby an attacker may remove a message sent between a DRM agent and an RI, typically resulting in Denial of Service (DoS) attacks. A message removal attack can include: message removal during the registration protocol or the RO acquisition protocol, replay nonce removal, removal of ROAP trigger, etc.

3. Message Modification, whereby an attacker may modify any message sent between a DRM agent and an RI, typically resulting in DoS attacks. A message modification attack can include modification during the registration protocol, during the join domain and leave domain protocols, and to various ROAP triggers.

4. Message Insertion, whereby an attacker may insert messages into the communication channel at any point between an RI and a DRM agent. The attacker may also record messages and try to replay them at a later point in time. A message insertion attack can include messages inserted while in the registration protocol, the 2-pass and 1-pass RO acquisition protocols, and to various ROAP triggers.

5. Other attacks such as general DoS attacks, passive attacks such as traffic analysis, and privacy disclosing.

The following problems of the current OMA DRM specifications and implementations are identified. An expanded notion of "integrity" as applied to the OMA DRM schemes is defined. In the traditional sense, the OMA DRM specifications only address a small scope of ROAP message integrity. In the expanded notion of integrity defined in the present invention, it is noted where and what kind of integrity can be considered in the following.

1. DRM Platform Integrity. This relates to integrity at or within the platform entities, i.e., at the physical entities comprising the device, the RI, and the content functions. The different entities include the operating system (OS), the boot code (e.g., the BIOS in the PC case), the HW/firmware (FW)/SW for memory access, the various HW/FW/SW entities that process security related functions (such as cryptography and key management, as well as privileged storage of secret data such as policies, certificates, etc.), and the network and local connectivity HW/FW/SW. Platform integrity determines whether the platform is valid, genuine, not modified except by legitimate processes, and operates only as intended.

2. DRM SW Integrity. DRM SW refers to software entities and components residing in the device, the RI, or the CI that perform functions specific to OMA DRM specifications and their procedures. At the device, the DRM agent consists of the DRM SW. At the RI and the CI, the DRM SW refers collectively to the set of SW that performs the DRM-specific functions such as RO packaging, DCF formatting, content encryption, content or RO delivery, verification, ROAP processing, etc. DRM SW integrity is maintained if the DRM SW is valid, genuine, not modified except by legitimate processes, and operates only as intended.

3. Integrity of the ROAP messages and information. The integrity of the ROAP messages and their constituent information is maintained if such information is validated, genuine, and not modified except by legitimate processes. In the OMA DRM 2.0 specifications, certain subsets of ROAP messages and their constituent information are integrity protected by use of digital signatures.

4. Integrity of the media object and DRM content. The media objects and the DRM content must also be integrity protected, i.e., must not be modified, removed, or falsely inserted, whether they are stored at the device, the RI, or the CI, or are in transit or delivery between any two parties. Of particular interest is the over-the-air (OTA) delivery of content, as applicable to the transfer of content to a mobile device, where the DRM content is delivered using essentially open channels.

5. Integrity of DRM-related information. DRM-related information such as the entity IDs (device ID, RI ID, etc.), encryption keys (CEK, REK) and signature keys, the ROs themselves, context information, certificates, and other trust-chain related information must be securely protected, which means that they should be protected not only for confidentiality but also for integrity.

It is noted that neither the current OMA DRM 2.0 specifications nor existing prior art appear to have proposed solutions to the entity compromise or integrity problems. This lack of solutions poses the following problem: Even if all the ROAP procedures are correctly implemented as according to the OMA DRM 2.0 specification, for example, how can a device really know whether the RI's platform is trustworthy? In other words, how can the device know whether the RI's platform will not abuse the data that the device sends as part of the ROAP protocols or abuse the DRM processing itself? For example, the device does not know whether the RI will arbitrarily and incorrectly limit the usage rights of the device because the RI's platform SW is compromised and it limits the otherwise valid usage rights of the device. Similar questions arise for the problem of the integrity of the DRM software. More specifically, some of the problems of the current OMA DRM 2.0 systems as viewed from the expanded notion of integrity as described above, are as follows.

1. A lack of methods to check and report the integrity of the platform and the DRM SW. As related to the entity compromise threat identified above, there is no method in the prior art for explicit and structured platform integrity verification and SW agent integrity verification between the device and the RI, either as specified by the OMA DRM 2.0 specifications or as part of the TCG 1.2 Use Cases. This is particularly true for platform integrity verification, rather than just the DRM agent.

2. A platform (such as a PC or PDA, as related to the device, or a server, as for the RI) could be maliciously compromised, which may result in preventing the DRM agent and the RI agent SW from performing correctly, even given correct and confidentiality-protected and integrity-protected information. For example, an otherwise well-protected DRM agent SW may store some information in plaintext in a shared memory prior to, during, or after processing. A compromised platform may, in such cases, egregiously access the shared memory and remove the information, alter the information, or insert new false information, which then could be processed subsequently by the DRM agent SW which may perceive such false information as genuine. This may result in DoS attacks, unauthorized disclosure of private information, or unauthorized delivery, distribution, or consumption of DRM ROs or DRM content.

3. The DRM agent SW and the RI SW, which are pieces of SW that process DRM-related information, may become compromised for various reasons. Such SW, for example, could be altered by a virus or other malicious SW entities. One result of such a compromise in the platform or the DRM SW would be a subsequent compromise in the integrity of the messages and information that the OMA DRM 2.0 considers, especially the ROAP protocol messages. Partly because only some, but not all, of the ROAP messages are integrity-protected, they can in theory be manipulated in synchronized ways between a compromised device and a rogue or compromised RI. Messages could be modified synchronously at both the device and the RI, and still may appear to be "integrity verified", since the messages were modified in the same way.

4. Insufficient integrity protection of the ROAP messages. As related to the message integrity, the ROAP messages and the information carried by the various message fields are subject to vulnerabilities that are not solved by the OMA DRM 2.0 specification. For example, the ROAP message integrity protection currently specified in the OMA DRM 2.0 specification leaves holes such as:

4A. Not all ROAP messages are integrity protected. Not including digital signatures in all the messages could pose vulnerabilities in certain cases.

4B. Even when ROAP messages or certain fields of information are integrity protected by digital signatures, once such information has been decrypted, integrity checked, and then "used" in plaintext, malicious entities could access the plaintext information and remove, alter, or redistribute the previously integrity-checked information. Thus, a strengthened integrity protection is required.

5. Vulnerabilities regarding the integrity of the DRM content and its delivery. More specifically, the following problems exist:

5A. Content integrity checking mechanisms are incomplete. For example, integrity of the content while the content is in transit or in delivery (e.g., OTA download) is not specified. The signature for the DCF, for example, is only generated for use in the ROAP procedures. Until and before the ROAP procedures take place, there is no integrity checking mechanism that manages the content integrity while in storage at the CI, for example.

5B. Content encryption, even for use in the ROAP protocol, is mandatory but integrity checking is only optional.

5C. Especially for packetized content for streaming services, the PDCF format has a timing issue. Packets that had been illegitimately modified could be downloaded and may even be consumed (i.e., played on a media player) before the integrity of the whole stream can be checked.

The central problem becomes: how can the various parties (the device, the RI, and the CI) be assured of the platform integrity and the DRM SW integrity? Thus, a method to strengthen and verify the integrity of the platform (e.g., the OS, the BIOS, drivers, media player, communication software, shared memory, etc.) upon which either the DRM agent SW or the RI SW rely, is needed. The present invention addresses the shortcomings of the prior art.

SUMMARY

The present invention discloses several methods that strengthen the integrity of entities, messages, and processing related to the OMA DRM specification v2.0. The methods use techniques commonly known as Trusted Computing techniques, as specified by the industry forum Trusted Computing Group (TCG). In a first embodiment of the invention, techniques to verify platform and DRM SW integrity or trustworthiness, both with and without modifications to the DRM ROAP and DCF specifications, are disclosed. In a second embodiment, techniques to strengthen the integrity of the OMA DRM ROAP messages, constituent information, and processing without changing the existing ROAP protocol are disclosed. In a third embodiment, techniques to strengthen the integrity of ROAP messages, information and processing with some changes in the existing ROAP protocol are disclosed.

BRIEF DESCRIPTION OF THE DRAWINGS

A more detailed understanding of the invention may be had from the following description of a preferred embodiment, given by way of example and to be understood in conjunction with the accompanying drawings, wherein:

FIG. 11 is a flowchart of a method for performing DRM software integrity checking between two entities where the two entities could be a device and an RI or a device and a CI;

DETAILED DESCRIPTION OF THE PREFERRED EMBODIMENTS

Hereafter, the term "wireless transmit/receive unit" (WTRU) includes, but is not limited to, a user equipment, mobile station, a fixed or mobile subscriber unit, a pager, or any other type of device capable of operating in a wired or wireless environment. When referred to hereafter, the term "base station" includes, but is not limited to, a Node B, a site controller, an access point, or any other type of interfacing device in a wireless environment.

The present invention discloses methods whereby information regarding the trust state or the integrity of a DRM entity (e.g., the device, the RI, or the CI) is explicitly and mutually requested and exchanged between any two DRM entities as a pre-requisite to the OMA DRM procedures.

Figure 7:
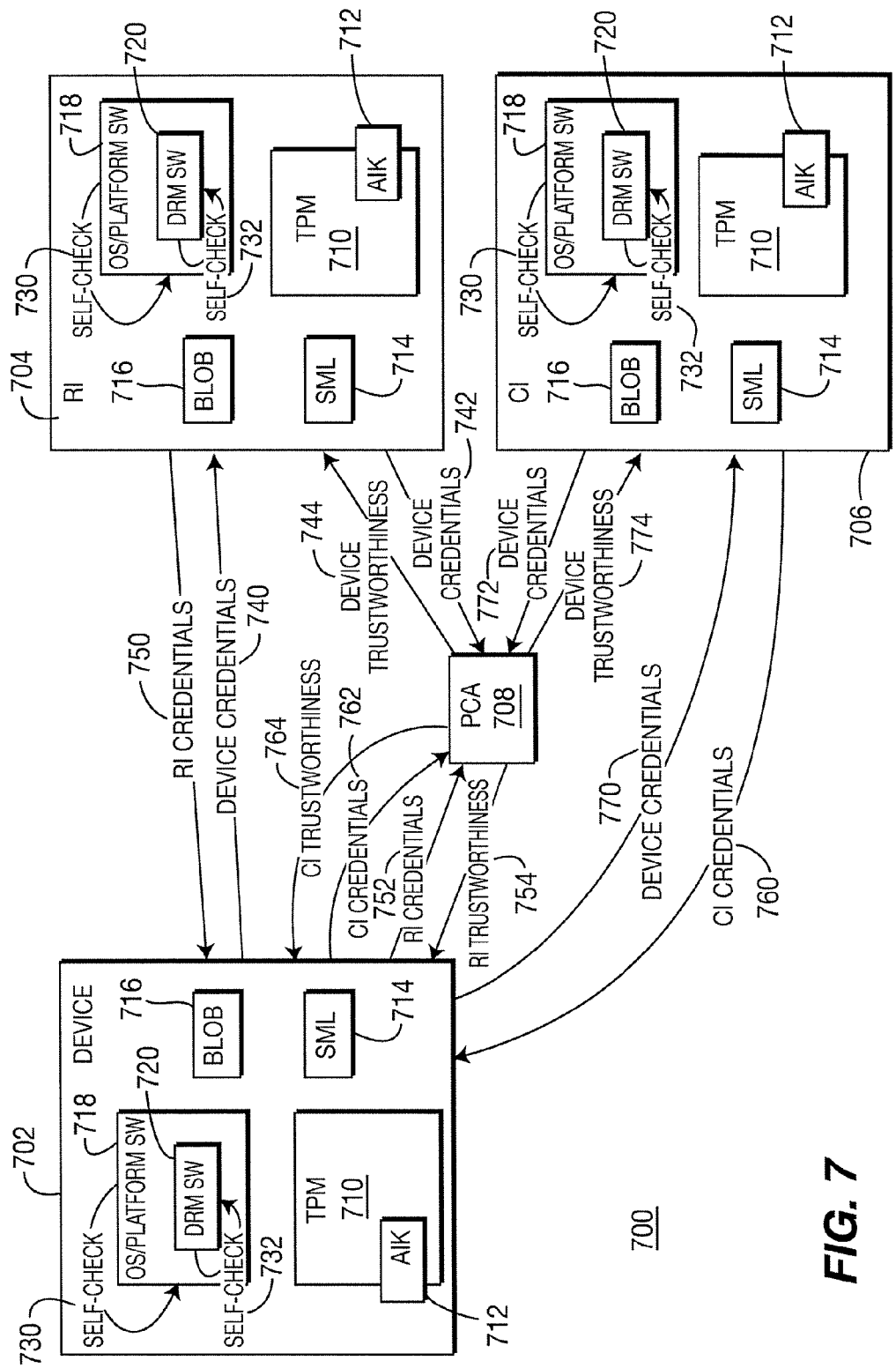
FIG. 7 is a block diagram of multi-party platform integrity checking among OMA DRM 2.0 entities.

A general architecture 700 of this method is shown in FIG. 7. The architecture includes four DRM entities: a device 702, an RI 704, a CI 706, and a Private Certification Authority (PCA) 708. The platform integrity checking assumes that the PCA 708 has records of the trusted computing (e.g., TCG) credentials for the other DRM entities (e.g., the device 702, the RI 704, and the CI 706), and provides a root of trust for certification of the TCG credentials.

Any pair of entities (e.g., the device 702 and the RI 704, the device 702 and the CI 706, or, the RI 704 and the CI 706) that want a mutual platform integrity check between themselves are trusted computing capable (e.g., are equipped with TCG Trusted Processing Modules (TPMs) 710). This implies that the trusted computing capable DRM entity not only have a TPM 710 (or an equivalent) but also related TCG resources such as the AIK 712, the SML 714, and protected memory using blobs 716. Also present are OS or platform software 718 and DRM software 720.

When the above requirements are met, any pair of different DRM entities can mutually check their platform integrity or platform trusted state using the PCA 708 and the trusted computing capabilities. As an example, the procedures for mutual integrity checking between the device 702 and the RI 704 are as follows.

The device 702, the RI 704, and the CI 706 are all capable of performing a self-check of the OS or other platform software components (step 730) and a self-check of the DRM software (step 732). The self-checks can be requested as part of a larger verification process (as discussed in greater detail below) or can be standalone processes. If either of the self-checks were to fail, that could be an indication that the entity has been compromised and should not be trusted.

The device 702 sends information about its platform TCG credentials to the RI 704 (step 740). Examples of the platform TCG credentials include, but are not limited to, a signed TCG platform certificate or a signed TPM certificate. As part of the credentials, the device 702 can also send the RI 704 a self-attested Trusted State or Platform Integrity Checked flag as supplemental information. If the device 702 is going to verify the platform integrity of the RI 704, the credential information sent in step 740 will also include an indication by the device 702 that it wants the RI 704 to initiate procedures to verify its platform integrity. It is noted that the device 702 will be able to make a decision regarding whether to verify the platform integrity of the RI 704 only if the verification of the RI's platform integrity status is an optional feature; in one embodiment, verifying the RI's platform integrity is a mandatory feature.

Upon receiving the credential information from the device 702, the RI 704 relays the credential information to the PCA 708 (step 742) and also requests the PCA 708 to verify the credentials about the device 702, especially the device's most current trustworthiness. The PCA 708 then sends the most current trustworthiness information (e.g., platform trust level, etc.) regarding the device 702 to the RI 704 (step 744). Upon receipt of the device platform trustworthiness information from the PCA 708, and also optionally the supplemental information from the device 702, the RI 704 evaluates the trust level of the device 702. The RI 704 decides whether to impart sufficient trust on the device platform's integrity to proceed further with the DRM procedures such as the registration protocol or RO acquisition protocol.

The device 702, either as a mandatory procedure or as an optional procedure, can evaluate the platform integrity of the RI 704 in similar and reciprocal ways as in the steps 740-744. More specifically, the RI 704 sends information about its platform TCG credentials to the device 702 (step 750). As part of the credentials, the RI 704 can also send the device 702 a self-attested Trusted State or Platform Integrity Checked flag as supplemental information.

Upon receiving the TCG-related information from the RI 704, the device 702 relays the information to the PCA (step 752) and also requests the PCA 708 to verify the credentials about the RI 704, especially the RI's most current trustworthiness. The PCA 708 then sends the most current trustworthiness information regarding the RI 704 to the device 702 (step 754). Upon receipt of the RI platform trustworthiness information from the PCA 708 regarding the RI 704, and also optionally the supplemental information from the RI itself, the device 702 evaluates the trust level of the RI 704. The device 702 decides whether to impart sufficient trust on the RI platform's integrity to proceed further with the DRM procedures such as the registration protocol or RO acquisition protocol.

The device 702, either as a mandatory procedure or as an optional procedure, can evaluate the platform integrity of the CI 706. The CI 706 sends information about its platform TCG credentials to the device 702 (step 760). As part of the credentials, the CI 706 can also send the device 702 a self-attested Trusted State or Platform Integrity Checked flag as supplemental information.

Upon receiving the TCG-related information from the CI 706, the device 702 relays the information to the PCA (step 762) and also requests the PCA 708 to verify the credentials about the CI 706, especially the CI's most current trustworthiness. The PCA 708 then sends the most current trustworthiness information regarding the CI 706 to the device 702 (step 764). Upon receipt of the CI platform trustworthiness information from the PCA 708 regarding the CI 706, and also optionally the supplemental information from the CI itself, the device 702 evaluates the trust level of the CI 706. The device 702 decides whether to impart sufficient trust on the CI platform's integrity to proceed further with the DRM procedures.

The platform integrity of the device 702 can be verified by the CI 706 as follows. The device 702 sends information about its platform TCG credentials to the CI 706 (step 770). As part of the credentials, the device 702 can also send the CI 706 a self-attested Trusted State or Platform Integrity Checked flag as supplemental information. If the device 702 is going to verify the platform integrity of the CI 706, the credential information sent in step 770 will also include an indication by the device 702 that it wants the CI 706 to initiate procedures to verify its platform integrity. It is noted that the device 702 will be able to make a decision regarding whether to verify the platform integrity of the CI 706 only if the verification of the CI's platform integrity status is an optional feature; in one embodiment, verifying the CI's platform integrity is a mandatory feature.

Upon receiving the credential information from the device 702, the CI 706 relays the credential information to the PCA 708 (step 772) and also requests the PCA 708 to verify the credentials about the device 702, especially the device's most current trustworthiness. The PCA 708 then sends the most current trustworthiness information regarding the device 702 to the CI 706 (step 774). Upon receipt of the device platform trustworthiness information from the PCA 708, and also optionally the supplemental information from the device 702, the CI 706 evaluates the trust level of the device 702. The CI 706 decides whether to impart sufficient trust on the device platform's integrity to proceed further with the DRM procedures.

It is noted that in the above example, steps 740-744, for the device 702 to verify its integrity status to the RI 704, are a mandatory feature of the present invention. However, verifying the platform integrity of either the RI 704 to the device 702 (steps 750-754), verifying the platform integrity of the CI 706 to the device 702 (steps 760-764), and verifying the device platform integrity to the CI 706 (steps 770-774) are optional, yet highly recommended, features in a DRM system.

It is also noted that these procedures need not be initiated by an active initiation by the entity that needs to be verified. The integrity verification procedures could start with a request by the entity wishing to verify the integrity of the other party. In such cases, steps 740, 750, 760, or 770 would each be preceded by another step, whereby the entity wishing the verification of the platform integrity of the other party calls or requests the other party to send relevant trust-related information.

In an alternate embodiment, for a practical OMA DRM system implementation, the conditions or trigger mechanisms for the proposed platform integrity verification procedures described above may include the following.

1. The device platform integrity verification procedures (i.e., steps 740-744), could be performed by one or more of the following.

1A. Before a device wishes to initiate a new 4-pass ROAP registration protocol.

1B. Once per each RI, before the first registration with the particular RI takes place. In this case, the RI will receive the device's TCG credentials once before the first registration, and then the RI protects the device's credential information under its own TPM by binding the credential information with a TPM key. The RI then later unbinds the stored TCG credential and verifies, either periodically or upon some events, whether the device's TCG credential that it has received is still valid, e.g., by consultation with a OCSP CA.

1C. Periodically, every time a specified time duration, for example, $T_{DEV\text{-}PLATFORM\text{-}LAST\text{-}REG}$, has elapsed since the device completed the last registration protocol with the same RI.

1D. Periodically, every time a specified time duration, for example, $T_{DEV\text{-}PLATFORM\text{-}LAST\text{-}REPORT}$, has elapsed since the last time the device had verified its platform integrity status to the same RI.

2. If and when the RI platform integrity verification procedures (i.e., steps 750-754) are implemented, they could be performed by one or more of the following.

2A. Once per each device, before the first registration with the particular device takes place. In this case, the device will receive the RI's TCG credentials once before the first registration, and then the device protects the RI's credential information under its own TPM by binding the credential information with a TPM key. The device then later unbinds the stored TCG credential and verifies, either periodically or upon some events, whether the RI's TCG credential that it has received is still valid, e.g., by consultation with an OCSP CA.

2B. Anytime an RI receives an indication from the device that the device wishes the RI to verify its integrity status to the device, either as a standalone message or as part of a modified ROAP protocol message.

2C. Periodically, every time a specified secure time duration has elapsed, for example, $T_{RI-PLATFORM-LAST-REPORT}$ has elapsed since the last time the RI has verified its integrity status to the device.

3. As for the platform integrity verification between a device and a CI, mechanisms similar to the above can be considered for periodic and/or event-driven occurrence of the integrity verification process. Also, in the case of the device's verification of the CI's platform integrity, it could also be performed every time before content has to be purchased or downloaded, and possibly vice versa (i.e., the device's platform integrity has to be verified to the CI).

The prior art has considered use of a "secure boot-up" using TCG techniques coupled with the application of robust DRM. In such schemes, the platform's OS and other boot-up related code are integrity-checked whenever a device is booted, implicitly performing a platform integrity check before any DRM application can be run. The present invention provides a more systematic and explicit use of the boot-time platform integrity check, as well as platform integrity checks at other times based on pre-determined periods of time as well as upon the occurrence of certain events. The present invention also generalizes platform integrity checking from the device to the RI and the CI as well. The continuous platform integrity checks are beneficial due to the fact that just because a device has correctly received a particular valid CO, it doesn't mean that the RI or the CI should be considered trustworthy indefinitely into the future from that time. A periodic and/or event-driven continual verification of the trustworthiness provides a good protective mechanism.

Also, as for the need for the integrity checking between the device and the CI, even if the content arrives before an RO, the content may be compromised when the integrity of the CI's platform or the CI's DRM SW is compromised. For example, suppose a user has downloaded a file. Even when the RO has not yet been acquired, a user may inadvertently click on the content or may perform a validity check on the content. If the content was compromised (e.g., has a virus attached to it) the content, even without an RO, could do damage to the device. Also, in the pre-download interactions between the device and a CI (for example, during the discovery phase), a compromised device can do harm to a CI, for example, by adding a virus attached to the content to a message intended for the CI. In addition, from a business perspective, a CI would not want to send content to a compromised device; for example, a compromised device could redistribute content for free to unauthorized recipients.

The mutual platform (and SW) integrity verification between a device and a CI thus have merits in protecting the entire system.

It is also noted that there can be several different ways to embody the central ideas outlined in the above architectural discussions. Two such examples are discussed below, but it is noted that these are only illustrative examples of the broader concepts based on the architecture described in the above paragraphs.

Platform Integrity Verification

Figure 8:
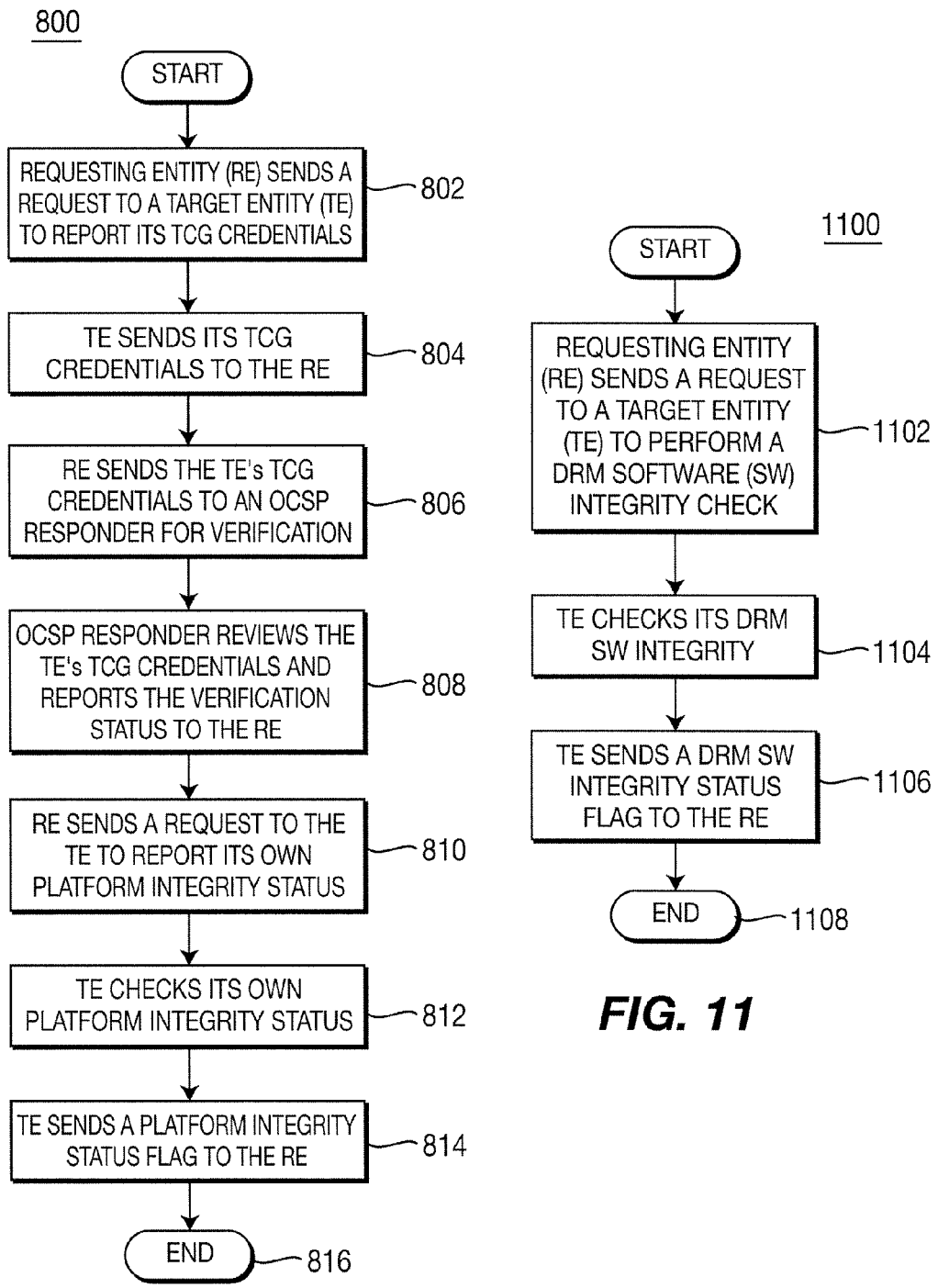
FIG. 8 is a flowchart of a method for performing platform integrity verification between two entities where the two entities could be a device and an RI or a device and a CI.

FIG. 8 is a flowchart of a method 800 for performing platform integrity verification between two entities. The two entities can be a device and an RI, a device and a CI, or an RI and a CI. The method 800 utilizes a requesting entity (RE) and a target entity (TE); it is noted that either entity of the pair (device, RI, or CI) can be the RE. The method 800 operates in the same manner regardless of which entity is the RE and which entity is the TE.

The method 800 begins with the RE sending a request to the TE to report its platform integrity status (step 802). In response to the request, the TE send its TCG credentials to the RE (step 804). The TCG credentials can include, for example, platform credentials, TPM credentials, or conformance credentials. The RE then sends the TE's TCG credentials to an OCSP Responder for verification of the credentials (step 806). The OCSP Responder reviews the TE's TCG credentials and reports the verification status to the RE (step 808).

The RE sends a request to the TE to report its own platform integrity status (step 810). The TE checks its platform integrity status (step 812), sends a platform integrity status flag to the RE (step 814) and the method terminates (step 816).

The method 800 can be applied either without changes to the ROAP protocols (discussed below in connection with FIG. 9) or with changes to the ROAP protocols (discussed below in connection with FIG. 10).

Integrity Verification without Changes to the ROAP Protocols

Figure 9:
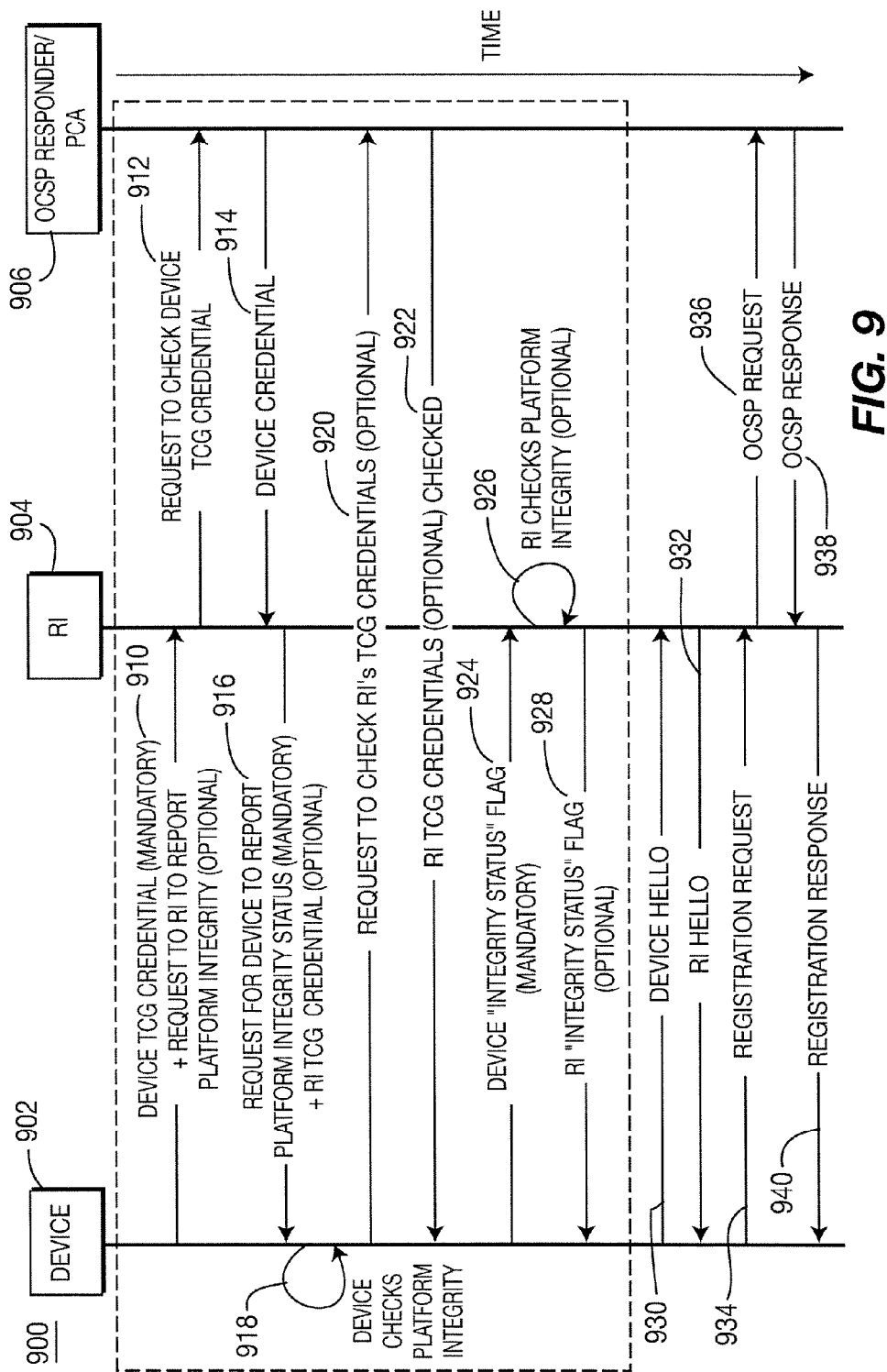
FIG. 9 is a flow diagram of a 4-pass ROAP registration protocol for performing mutual platform integrity checking between a device and an RI using prior trust checking.

FIG. 9 is a flow diagram of a method 900 to exchange integrity-related information between a device 902 and an RI 904 using TCG techniques (i.e., utilizing an OCSP responder/PCA 906) separately from the ROAP protocol. It is noted that in the method 900, the same entity 906 is depicted as being both a PCA for the DRM processing as well as an OCSP responder for TCG processing. In the method 900, the platform integrity verification (as shown by the dashed rectangle) is performed prior to the ROAP 4-pass registration protocol. Performing platform integrity verification before the registration protocol is useful because the registration protocol is not frequently performed and the platform integrity verification process takes some time to complete; if the platform integrity verification were performed with each message, the overall operation of the system could be unnecessarily slowed. A person skilled in the art could assume that after the platform integrity verification is performed, that only one Device Hello message would be received by the RI, as it would indicate a trusted device. If more than one Device Hello message were received by the RI from the same device, it could be an indication of a DoS attack. Platform integrity verification could also be performed in connection with the authentication protocol and the object acquisition protocol.

The device 902, prior to initiating the 4-pass registration protocol with the RI 904, starts a separate set of procedures with the RI 904 to perform mutual verification of platform integrity. The device 902 first sends its own TCG credentials (e.g., platform credentials, TPM credentials, conformance credentials, etc.) or other information including or related to the TCG credential, to the RI 904 (step 910). Optionally, the device 902 also sends a request to the RI 904 to check and report its own platform integrity status to the device 902; this request is included with the device credentials.

The RI 904 requests the PCA 906 to verify the device's TCG credentials (step 912). The PCA 906 responds to the RI's request and sends information on the device's TCG credential (step 914).

The RI 904 requests the device 902 to report its platform integrity status flag (step 916). Also, if the device 902 has requested that the RI 904 verify and report its platform integrity status in step 910 and if the RI 904 wishes to and is able to oblige to the request, the RI 904 sends its own TCG credential or other information including or related to the TCG credential, to the device 902 in step 916. If the RI 904 cannot or does not wish to oblige to the request, it sends a "not obliging" message to the device. The RI 904 may not respond to the request for a number of reasons, including a resource limited RI (i.e., the RI does not have sufficient available resources to respond to the request) or the device credibility check fails. The device may abort the protocol depending on the confidence level that the device has with the RI; if the device trusts the RI, it would likely continue with the protocol even if the RI refused to respond to the request. Upon receiving the request from the RI 904 to check the platform status, the device 902 checks its own platform integrity status (step 918).

The device 902 requests the PCA 906 to verify the RI's TCG credential (step 920). The PCA 906, upon such receiving the request form the device 902, returns information on the RI's TCG credential (step 922). The device 902 sends its platform integrity status flag to the RI 904 (step 924). If the RI 904 received a request from the device 902 to check its integrity status, and if the RI 904 wishes to and is able to oblige to the request, the RI 904 checks its own platform integrity (step 926). The RI then returns its platform integrity status flag to the device 902 (step 928). The optional steps regarding the RI integrity check can be performed in any order; those steps do not need to be intertwined with the device integrity check as shown in FIG. 9. In addition, the RI can initiate its own integrity check. Also, if RI refuses to fully respond to the request with its own TCG credential information for any of the possible reasons, it may indicate such fact to the device in an appropriate way, for example in step 922.

The method 900 enables the device 902 and the RI 904 to achieve mutual platform integrity verification. Upon such verification, the device can then start the ROAP registration protocol. The steps of the registration protocol (steps 930-940) shown in FIG. 9 are the same as steps 210-220 of the method 200 described above. It is also noted that these procedures can be triggered or repeated at periodic intervals.

Integrity Verification with Changes to the ROAP Registration Protocol

Figure 10:
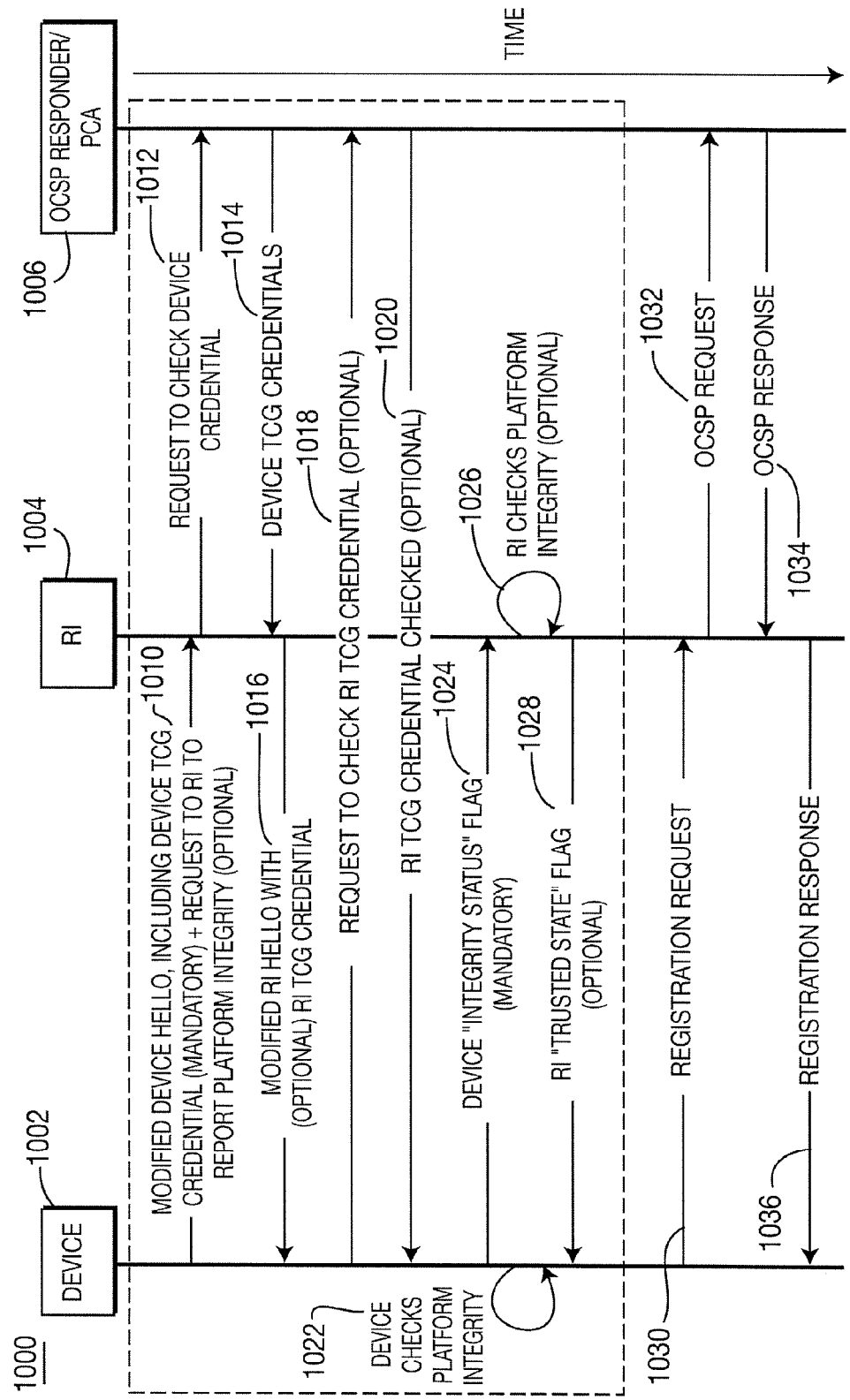
FIG. 10 is a flow diagram of a 4-pass ROAP registration protocol for performing mutual platform integrity checking between a device and an RI using modified Device Hello and RI Hello messages.

FIG. 10, in another exemplary embodiment, shows a method 1000 in which a device 1002 and an RI 1004 exchange integrity-related information, also utilizing the services of an OCSP responder/PCA 1006. In the method 1000, the existing Device Hello and RI Hello messages of the ROAP registration protocol are modified to convey both the TCG credential and the request to the other party for platform integrity verification.

The device 1002 sends a modified Device Hello message to the RI 1004 (step 1010), the message including the device TCG credential and an optional request to the RI 1004 to report its platform integrity. The RI 1004 forwards the device credentials to the PCA 1006 for verification (step 1012). The PCA 1006 then returns the device TCG credentials to the RI 1004 (step 1014). The RI 1004 responds to the device 1002 with a modified RI Hello message (step 1016), the message optionally including the RI's TCG credential.

Next, the device 1002 optionally sends a request to the PCA 1006 to check the RI's TCG credential (step 1018). The PCA 1006 checks the RI's credentials and reports the result back to the device 1002 (step 1020). The device 1002 checks its own integrity status (step 1022) and reports the integrity status to the RI 1004 (step 1024).

Figure 1:
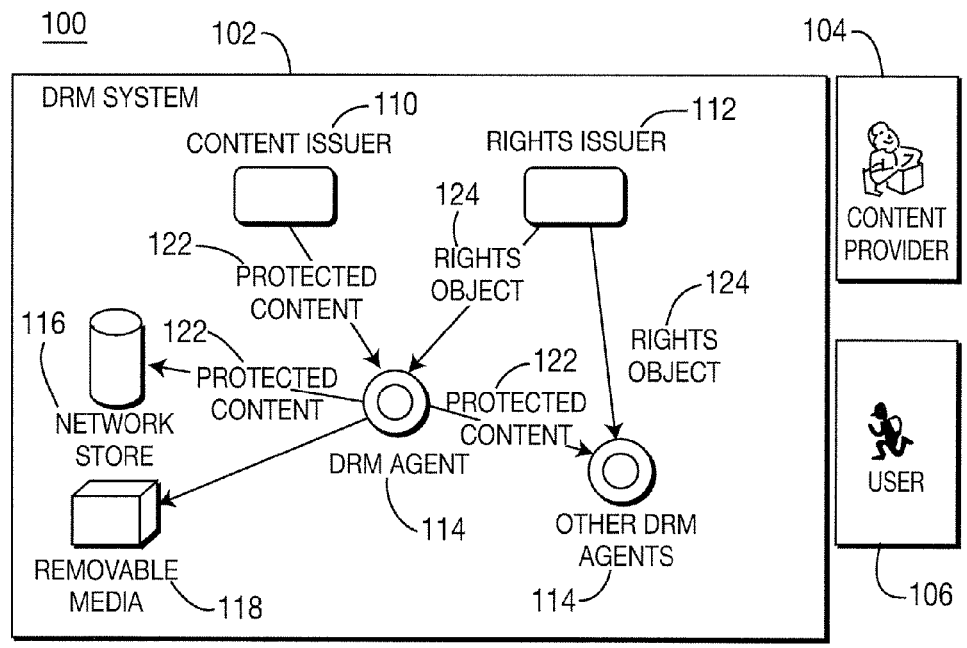
FIG. 1 is a block diagram of the existing OMA DRM 2.0 functional architecture.
Figure 2:
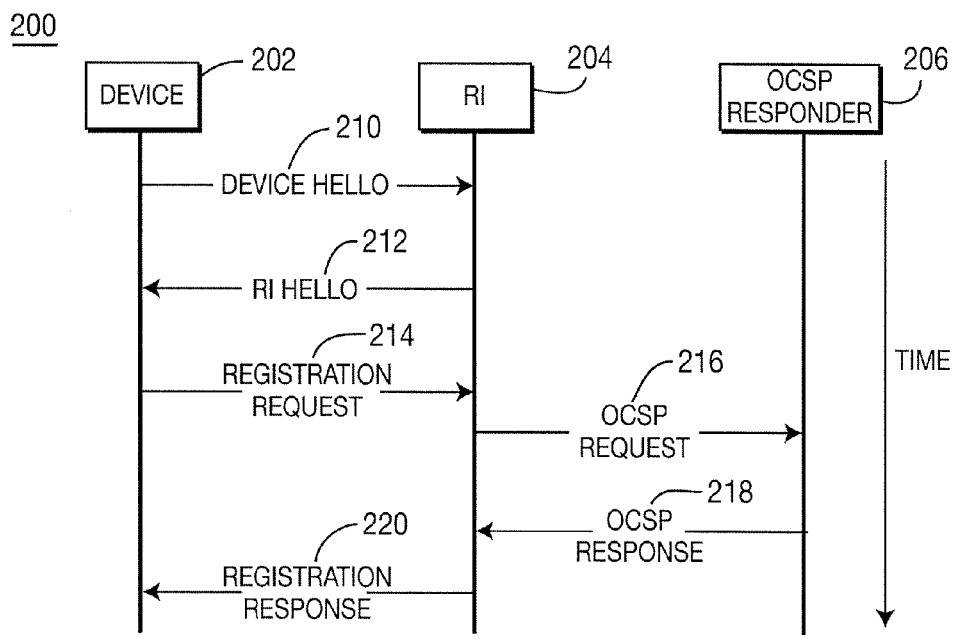
FIG. 2 is a flow diagram of the existing OMA DRM 2.0 ROAP 4-pass registration protocol.

If the device 1002 has requested that the RI 1004 report its integrity status, the RI 1004 performs a platform integrity check (step 1026) and reports the integrity status, e.g., its trusted state flag, back to the device 1002 (step 1028). The steps 1030-1036 are the same as steps 214-220 as shown in FIG. 2 of the ROAP registration protocol.

Checking the Integrity of the DRM Software

FIG. 11 is a flowchart of a method 1100 for checking the integrity of the DRM SW (e.g., the DRM user agent SW residing at the device or the DRM SW residing at the RI or the CI) among any pair of DRM entities. A requesting entity (RE) sends a request to a target entity (TE) to perform a DRM SW integrity check (step 1102). The TE checks its DRM SW integrity (step 1104), sends a DRM SW integrity status flag to the RE (step 1106), and the method terminates (step 1108). It is noted that when the TE is a device, the integrity of the device drivers and media player SW can be checked separately from the integrity of the DRM SW, if these two components exist separately on the device.

Figure 12:
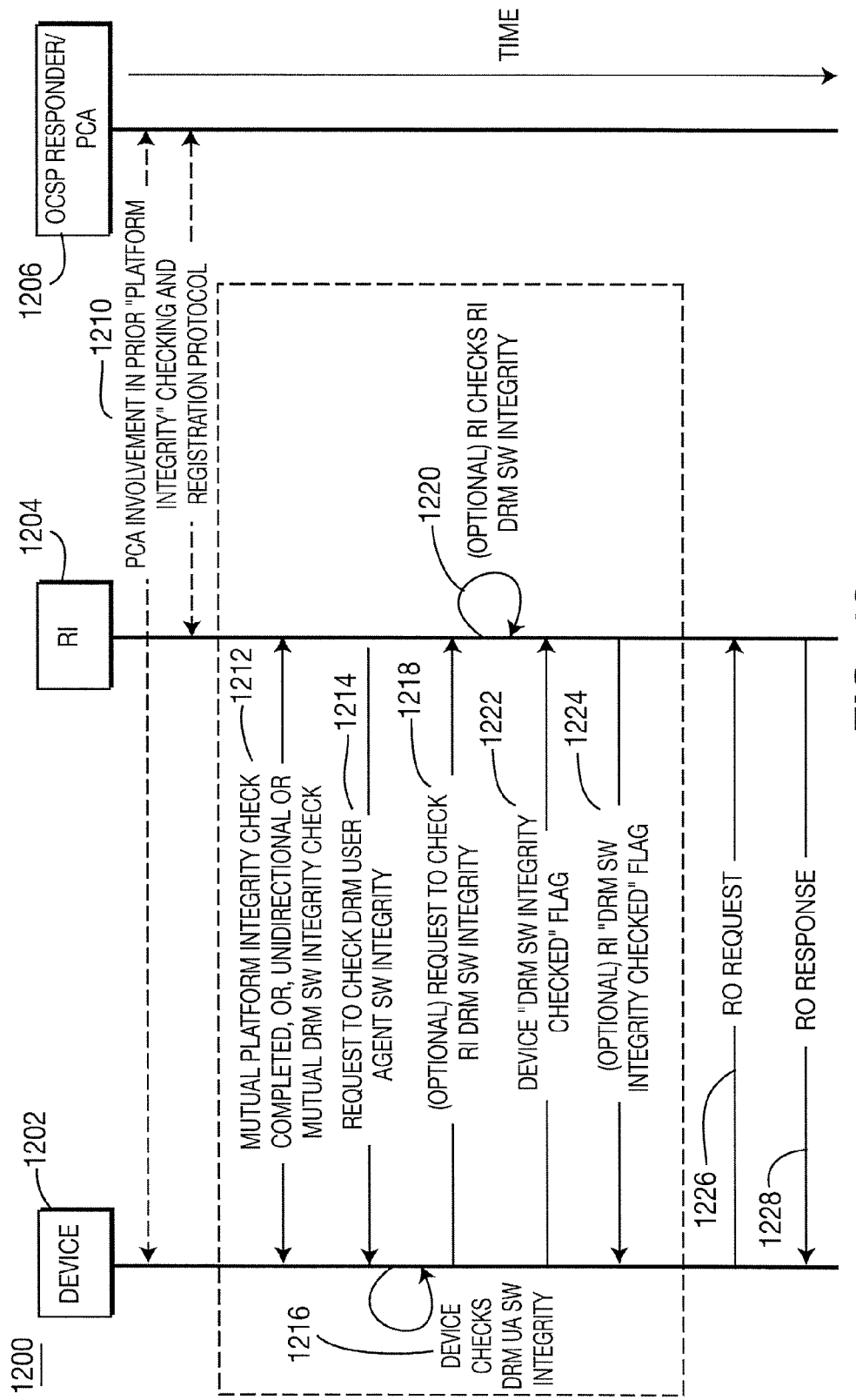
FIG. 12 is a flow diagram of a 2-pass ROAP RO acquisition protocol for performing mutual DRM software integrity checking between a device and an RI.

The method 1100 relates only to the RE obtaining a DRM SW integrity check from the TE. To perform mutual DRM SW integrity checking, the method 1100 would need to be performed twice, once from the RE to the TE and then from the TE to the RE (with the RE and the TE switching roles). During a mutual DRM SW integrity check, the requests can be intertwined (as shown in FIG. 12) or can be separated as shown in FIG. 11. The operation of the method does not change if a mutual DRM SW integrity check is being performed.

The OMA DRM 2.0 specification assumes, without suggesting how such assumptions can be validly implemented, that the DRM user agent SW (or the device DRM SW, in the terminology used in the present invention) as well as the RI (or the RI's DRM SW) can be implicitly trusted. The authentication protocol in the OMA DRM 2.0 specification thus only specifies the actual authentication procedures between entities that are already considered trustworthy. For obvious reasons, this implicit SW trust assumption in practice cannot be automatically assumed, without actual steps to implement and verify them. The methods described in this section concern such concrete steps.

FIG. 12 is a flow diagram of a method 1200 for applying the DRM SW check in connection with the ROAP RO acquisition protocol. The method 1200 utilizes a device 1202, an RI 1204, and an OCSP responder/PCA 1206. First, the PCA 1206 communicates with the device 1202 and the RI 1204 to perform platform integrity checking and the ROAP registration protocol (step 1210). The device 1202 and the RI 1204 perform a mutual platform integrity check, a unidirectional DRM SW integrity check, or a mutual DRM SW integrity check (step 1212).

The RI 1204 sends a request to the device 1202 to check and report the device's DRM user agent (UA) SW integrity (step 1214). The device 1202 checks its latest DRM UA SW integrity (step 1216). The device 1202 optionally sends a request to the RI 1204 to check and report the RI's DRM SW integrity (step 1218). If requested, the RI 1204 checks its latest DRM SW integrity (step 1220). The device 1202 sends a device DRM SW integrity status flag to the RI 1204 (step 1222). If previously requested, the RI 1204 sends an RI DRM SW integrity status flag to the device 1202 (step 1224). It is noted that the steps of the optional RI integrity check can be performed in any order and need not be intertwined with the device integrity check as shown in FIG. 12.

Figure 3:
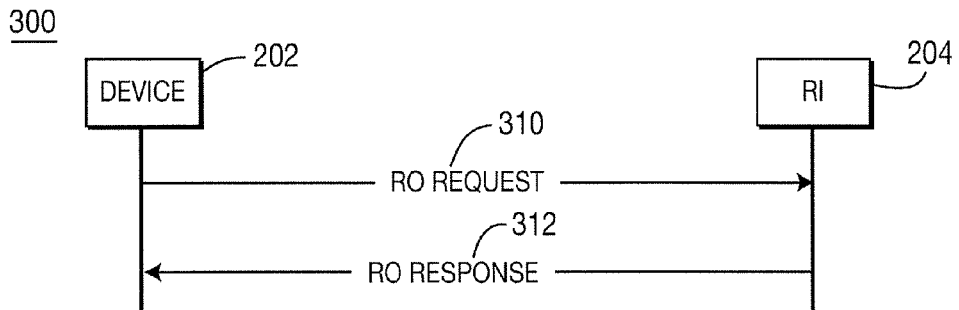
FIG. 3 is a flow diagram of the existing OMA DRM 2.0 ROAP 2-pass RO acquisition protocol.
Figure 4:
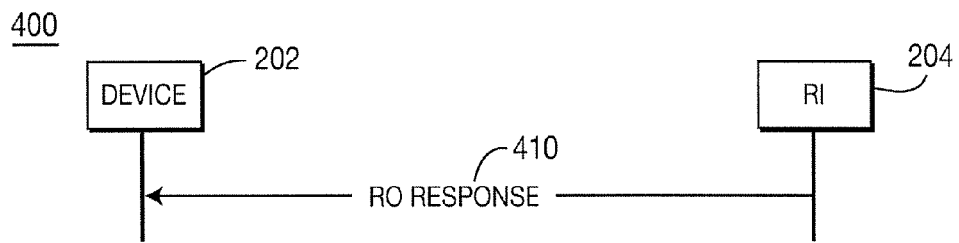
FIG. 4 is a flow diagram of the existing OMA DRM 2.0 ROAP 1-pass RO acquisition protocol.
Figure 5:
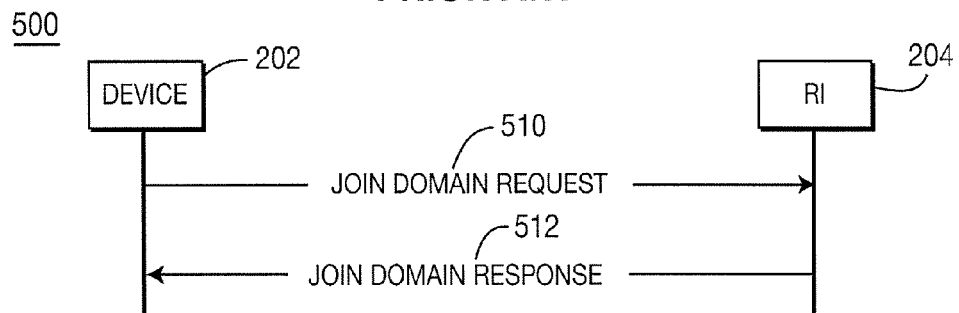
FIG. 5 is a flow diagram of the existing OMA DRM 2.0 ROAP 2-pass join domain protocol.
Figure 6:
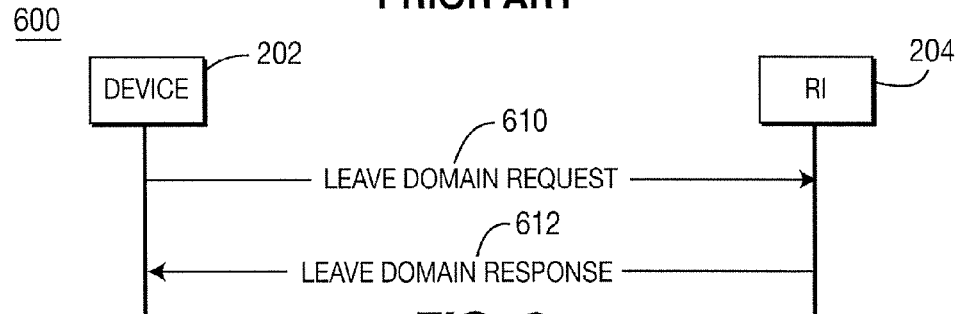
FIG. 6 is a flow diagram of the existing OMA DRM 2.0 ROAP 1-pass leave domain protocol.

It is noted that the method 1200 can be generalized for mutual DRM SW integrity verification between a device and a CI, instead of the illustrated device/RI interaction. Upon completion of steps 1210-1224, the device 1202 can start, for example, the 2-pass RO acquisition protocol in steps 1226 and 1228, which are the same as steps 310 and 312 as described above in connection with FIG. 3. It is further noted that although the method 1200 is shown in conjunction with the RO acquisition protocol, it can be used in conjunction with any other ROAP protocol, but to minimize the overhead associated with the method 1200, it could be performed with only an appropriately selected subset of ROAP protocols at any given time. For a practical OMA DRM system implementation, some of the conditions or trigger mechanisms for the proposed platform and/or DRM SW integrity verification procedures described above may include:

1. The device DRM SW integrity verification procedures can be triggered by one or more of the following.

1A. Before a device wishes to initiate a new 2-pass ROAP registration protocol, 2-pass join domain protocol, or the 2-pass leave domain protocol.

1B. Periodically, every time a specified time duration, for example $T_{DEV}$-DRM-LAST-ROAP, has elapsed since the device last completed the 2-pass ROAP registration protocol, 2-pass join domain protocol, or the 2-pass leave domain protocol with the same RI.

1C. Periodically, every time a specified time duration, for example $T_{DEV\text{-}DRM\text{-}LAST\text{-}REPORT}$, has elapsed since the last time the device had verified and reported its DRM SW integrity status to the same RI.

1D. Whenever a device updates its DRM SW.

1E. Whenever the platform SW is updated or changed.

2. The RI DRM integrity verification procedures could be performed by one or more of the following.

2A. Anytime an RI receives an indication from the device that the device wishes the RI to verify its DRM SW integrity status to the device, either as a standalone message or as part of a modified ROAP protocol message.

2B. Periodically, every time a specified time duration, for example $T_{RI\text{-}DRM\text{-}LAST\text{-}REPORT}$, has elapsed since the last time the RI has verified and reported its DRM SW integrity status to the device.

2C. Whenever an RI has updated its DRM SW.

2D. Every time before the device sends an RO request, in cases where the user is obtaining content on a frequent basis, such as with streaming content.

As for the platform integrity verification between a device and a CI, mechanisms similar to the above can be considered for periodic and/or event-driven occurrence of the DRM SW integrity verification process.

The proposed methods for DRM platform verification and DRM SW verification can be performed independently of each other, but it is also contemplated that these verification procedures can be combined as part of a group of procedures. In such an embodiment, the DRM platform verification steps are considered a pre-requisite for the DRM SW verification steps. For example, for integrity verification between a device and an RI, the device and the RI first establish the trust on each other's entire platform by performing the DRM platform verification procedures as described above. The trigger mechanisms include the general platform verification trigger conditions. Then, as the conditions for the DRM SW verification trigger arise, the DRM SW verification procedure follows. Note that both types of verification procedures will execute when their respective trigger conditions are met. However, the DRM SW verification steps will be mastered to the successful completion of the DRM platform verification steps, i.e., if the DRM platform verification fails between a device and an RI, further processing in the DRM SW verification as well as actual DRM ROAP processing and usage-related processing will fail.

Sealed-Signing and Binding

The OMA DRM 2.0 specification's existing mechanisms to protect the integrity of the ROAP protocol is limited to including digital signatures (or message integrity checking) in some, but not all, of the ROAP messages. Given that the ROAD protocol is of central importance in the secure DRM processing implementation, it is important to safeguard and continually verify the integrity of the information that is used and exchanged in the ROAP protocol.

Therefore, in an alternate embodiment of the present invention, methods are disclosed to strengthen the integrity of the ROAP protocol whereby information central to a reliable authentication and integrity verification between the DRM device and an RI can: (1) be safely stored using TCG techniques, and (2) be pre-verified before being transmitted to the other side or before being used for processing at the side where the information is stored.

This method involves two basic procedures that use the TCG techniques of sealed-signing (i.e., symmetrically encrypt target information and then asymmetrically sign the symmetric key plus a set of PCR values that indicate the then-current integrity status of either the platform or specific SW components) and binding (asymmetrically encrypt target information with a key whose private decrypting key is kept in a protected module such as a TPM). Sealed-signing imparts the highest level of information security provided by asymmetric encryption, digital signatures, and binding to a trusted state of the device DRM user agent SW as indicated by the protected PCR values. Binding imparts a high level of protection using asymmetric encryption where the decryption key is protected inside the TPM.

The following systematic principles use sealed-signing and binding to protect both the confidentiality and the integrity of the information that is used in the ROAP messages, and thereby indirectly enhance the strength of the integrity of the ROAP protocols themselves. In the following discussion, both the device and the RI (or the portion of the RI that deals with this specific device) are assumed to be equipped with a TPM and support full TPM functionality.

The device and the RI can each set aside and use a set of two storage keys to cryptographically bind and securely store certain information related to ROAP processing to the trusted platform on which the device or the RI resides. For the device, these keys are K_DEV_BIND_A and K_DEV_BIND_B. For the RI, these keys are K_RI_BIND_A and K_RI_BIND_B. These are TPM-maintained asymmetric keys (i.e., encryption is done with public key and decryption is done with private key protected inside a TPM).

The device and the RI each use either a single PCR or a set of PCRs for DRM processing. The device and the RI also set aside and use an Attestation Identity Key (AIK) to sealed-sign certain information related to ROAP processing to the trusted platform and its particular PCR values. It is noted that the TCG AIK keys are used only for signing PCR values. For the device, its AIK is K_DEV_AIK and for the RI, its AIK is K_RI_AIK. Also, the sealed-signing requires an asymmetric storage key for the encryption operation of the target data. The device and the RI thus each set aside and use a storage key for this purpose. The storage key for the device is K_DEV_STO_SEAL, and the storage key for the RI is K_RI_STO_SEAL.

Figure 13:
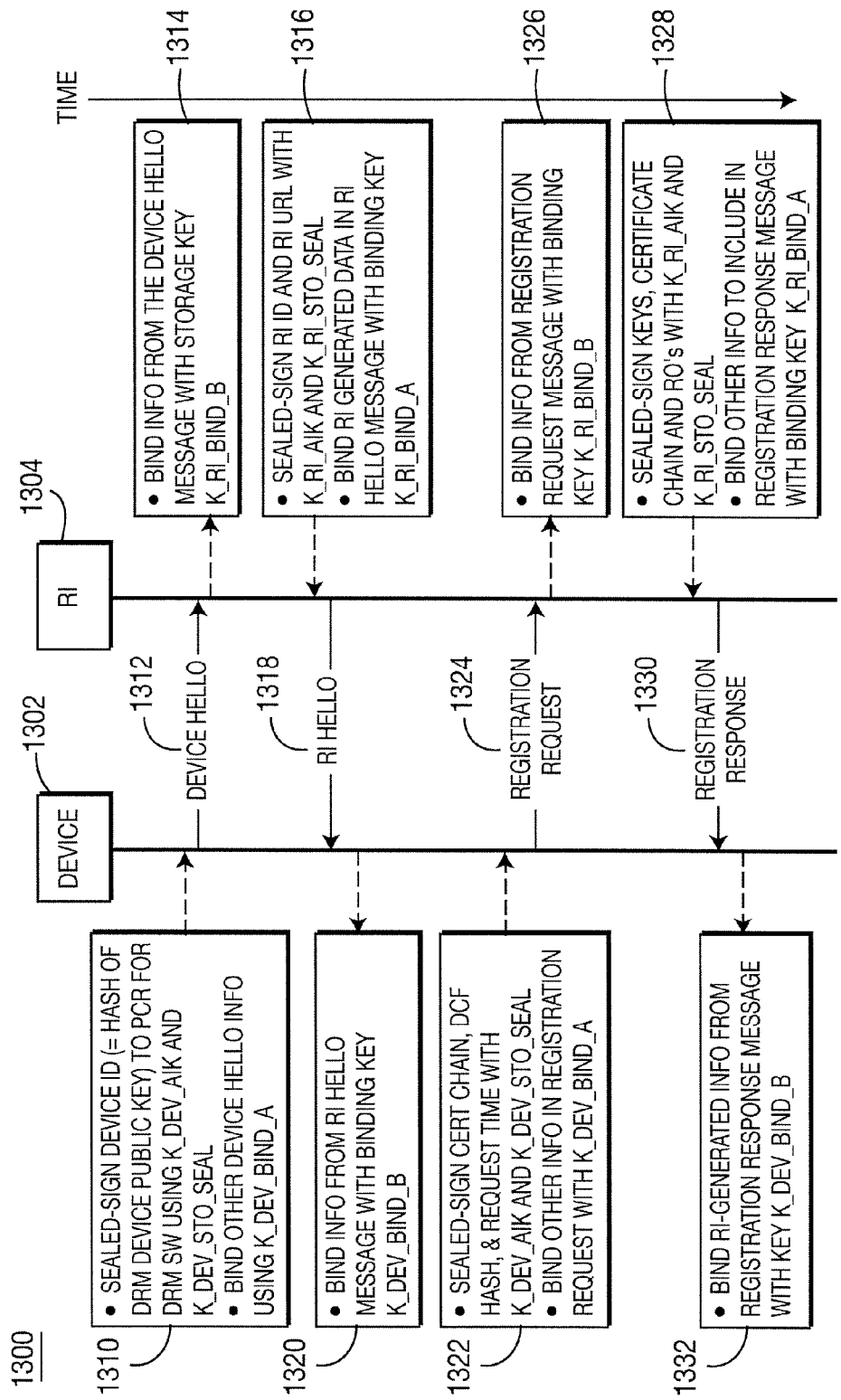
FIG. 13 is a flow diagram of a method for improving the integrity of ROAP messages and processing using TCG techniques including sealed-binding and memory blobbing.

The method then uses a combination of sealed-signing and binding with an added measure of protecting confidentiality as well as integrity to enhance the strength of storing the various information elements involved in the ROAP processing. For example, FIG. 13 is a flow diagram of a method 1300 in which TPM sealed-signing and binding operations are used to protect the confidentiality and integrity of information in the various messages that comprise the 4-pass ROAP registration protocol. In the method 1300, a device 1302 and an RI 1304 each sealed-sign a selective set of ROAP-related information and bind the information using two sets of storage keys that each either transmits (to the other side) or receives (from the other side) during the course of the 4-pass registration protocol.

The device 1302 first sealed-signs the device ID information element (which, in the OMA DRM case is the SHA-1 hash of the OMA DRM public key) with the encryption key K_DEV_STO_SEAL and the device-specific AIK K_DEV_AIK (step 1310). This information is bound (using asymmetric encryption) to other information intended for the Device Hello message with the storage key K_DEV_BIND_A (step 1310). The Device Hello message is then sent from the device 1302 to the RI 1304 (step 1312).

By sealed-signing information such as the device ID and binding the other information comprising the Device Hello message, the device 1302 could institute a policy that the Device Hello message will be transmitted only when and if the device 1302 recovers (i.e., unsealed-signs and unbinds) the previously sealed-signed and bound information from their protected storage, compares them to the current values of such information elements that the DRM SW may be using, and verifies the genuineness and integrity of the current values. It is noted that the choice of the information elements to be sealed-signed versus bound in this scenario is given just as an example. Other information elements may be sealed-signed and bound in different combinations without effecting the operation of the present invention. Other combinations can be derived from items such as system time, any information element in a message, algorithms, and nonces. One reason for securing the nonces is to determine whether the nonces are truly random, as some random number generators especially ones that may be harmfully compromised, may repeat the same pattern and generate the same numbers as their outputs in unacceptably short periods of time.

The RI 1304, upon receipt of the Device Hello message, binds the information contained in the Device Hello message with its binding key, K_RI_BIND_A (step 1314). This step allows secure, integrity-protected storage of the key information that the RI 1304 received from the device 1302. Alternatively, the RI 1304 can also extract the device ID (or any other information element) from the Device Hello message and sealed-sign that information element separately using the AIK K_RI_AIK and the encryption key K_RI_S-TO_SEAL.

The RI 1304 sealed-signs the RI ID and the RI URL information elements with the encryption key K_RI_S-TO_SEAL and the AIK K_RI_AIK (step 1316). The RI 1304 also binds the other information contained in its RI Hello message with the storage key K_RI_BIND_A (step 1316). The RI 1304 then sends the RI Hello message to the device 1302 (step 1318).

The RI 1304 transmits the RI Hello message to the device 1302 only when and if the RI 1304 first recovers (i.e., unsealed-signs and unbinds) the previously sealed-signed and bound information from the protected storage, compares them to the current values of such information elements that the RI DRM SW may be using, and verifies the genuineness and integrity of the current values.

The device 1302, upon receipt of the RI Hello message, binds the information contained in the RI Hello message with the second binding key, i.e., K_DEV_BIND_B (step 1320). This step allows secure, integrity-protected storage of the key information that the device received from the RI 1304. Alternatively, the device 1302 can also extract selected information elements from the received RI Hello message (such as the RI ID and/or the RI URL) and sealed-sign them using the AIK K_DEV_AIK and the encryption key K_DEV_STO_SEAL, while simply binding the rest of the information received in the RI Hello message using K_DEV_BIND_B.

The device 1302 sealed-signs the certificate chain, the DCF hash, and the Request Time with K_DEV_AIK and K_DEV_STO_SEAL (step 1322). The device 1302 then binds the other information intended for the Registration Request message with K_DEV_BIND_A (step 1322). The device 1302 then sends the Registration Request message to the RI 1304 (step 1324). The device 1302 only sends the Registration Request message if the device recovers (i.e., unseal-signs and unbinds) the previously sealed-signed and bound information, compares the recovered values to the current temporary values used in the DRM SW memory, and verifies the genuineness and integrity of the current values. Upon receipt of the Registration Request message, the RI 1304 binds the information from the Registration Request message with the binding key K_RI_BIND_B (step 1326).

The RI 1304 sealed-signs the keys, the certificate chain, and the ROs with K_RI_AIK and K_RI_STO_SEAL (step 1328). The RI 1304 then binds this with other information to be included in the Registration Response message with the binding key K_RI_BIND_A (step 1328). The RI 1304 then sends the Registration Response message to the device 1302 (step 1330). The RI 1304 only sends the Registration Response message if the RI recovers (i.e., unseal-signs and unbinds) the previously sealed-signed and bound information, compares the recovered values to the current temporary values used in the DRM SW memory, and verifies the genuineness and integrity of the current values. Upon receipt of the Registration Response message, the device 1302 binds the RI-generated information from the Registration Response message with the binding key K_DEV_BIND_B (step 1332).

It is noted that the sealed-signing and binding can be used with any other ROAP protocol. The method 1300 described above is exemplary, and its principles can be equally applied to any other ROAP protocol.

Data obtained during the OMA DRM ROAP message exchanges will need to be un-sealed and re-sealed to a new configuration PCR value, if the entity that sealed or sealed-signed the data has updated either its platform OS or the DRM SW. When such an event occurs, the DRM ROAP-related data that had been sealed or sealed-signed to a particular state (or, equivalently, to a particular set of PCR values) will have to be first un-sealed and then re-sealed to the most current state of the updated platform OS. There are existing techniques in the prior art that address this procedural requirement and it is assumed that such procedures will take place to ensure proper un-sealing and re-sealing of any DRM ROAP-related data that is stored using sealing or sealed-signing as proposed herein.

One additional enhancement is to add a field to the existing ROAP message formats to indicate the TCG capability of the sending device. The TCG capability field can assist in increasing interoperability with legacy devices by making an early determination whether the receiving entity can support TCG related information and procedures.

Modification of the Device Hello Message and its Derivation

A first modification is to add a new device TPM Capability Indication (DTCI), which is an indicator of the device's TPM capability in either a new element of the existing Extension parameter of the Device Hello message, or alternatively and preferably, add the DTCI as a new first parameter in the header of the Device Hello message. The DTCI can be either one bit (indicating either the absence or the presence of a device TPM) or a few bits (indicating more granular information on the device's TPM capability). If the DTCI is inserted as a new parameter, it preferably should be inserted as the first parameter, before the device ID parameter, so that the RI can know in advance of other parameters that the device has certain TPM capabilities and process the information from the later parameters (e.g., the device ID) utilizing the DTCI. The benefit of the DTCI information is that it allows the RI to evaluate the trustworthiness of the device in its further interaction with the device in the remainder of the ROAP protocols.

A second modification is to use the device-specific TCG EK credential or the TCG AIK credential to hash and derive the DRM device ID. The benefit of this modification is that the EK credential and/or the AIK credential is highly protected by the TPM inside the device, and thus, deriving the DRM device ID from either of these credentials strengthens the integrity of the DRM device ID information.

A third modification is to add a new signature parameter where the Device Hello message, up to but excluding the signature, is signed with the device's AIK private key, intended to be verified by the RI. The benefit of this modification is to protect the integrity of the device TPM capability from the first interaction between the device and the RI. The use of the device's AIK private key, which is highly securely protected by the TPM, strengthens the integrity of the signing operation.

Tables 12 and 13 show two possible formats for the modified Device Hello message. Table 12 shows the format of a message with the DTCI bit as the first parameter. Table 13 shows the format of the Device Hello message where the DTCI is a new element of the existing Extension parameter.

TABLE 12

Modified Device Hello message format with a separate DTCI parameter

| Parameter | Mandatory or Optional | Notes (Changes from OMA DRM 2.0 ROAP Device Hello message) |
| --- | --- | --- |
| Device TPM Capability Indicator (DTCI) | Optional | New Parameter: Either a 1-bit indicator (for absence or presence of a device TPM) or more bits indicating more granular information about the device TPM capability. |
| Version | Mandatory | Unchanged. |
| Device ID | Mandatory | Unchanged in format, but uses the SHA-1 hash computed by the device TPM of either the device TPM's EK credential or one of the device TPM's AIK credentials. |
| Supported Algorithms | Optional | Unchanged. |
| Extensions | Optional | Unchanged. |
| Signature | Mandatory | New parameter: Signature using the RSA-PSS algorithm on the Device Hello message up to and excluding the Signature parameter, signed by one of the device's AIK private keys for which the RI has pre-acquired the public key. |

TABLE 13

Modified Device Hello message format, with DTCI in the Extensions

| Parameter | Mandatory or Optional | Notes (Changes from OMA DRM 2.0 ROAP Device Hello message) |
| --- | --- | --- |
| Version | Mandatory | Unchanged. |
| Device ID | Mandatory | Unchanged in format, but uses the SHA-1 hash computed by the device TPM of either the device TPM's EK credential or one of the device TPM's AIK credentials. |
| Supported Algorithms | Optional | Unchanged. |
| Extensions | Optional | All of the OMA DRM 2.0 ROAP Device Hello Extensions elements, plus the DTCI element consisting of one or more bits indicating the device's TPM capability. |

TABLE 13-continued

Modified Device Hello message format, with DTCI in the Extensions

| Parameter | Mandatory or Optional | Notes (Changes from OMA DRM 2.0 ROAP Device Hello message) |
| --- | --- | --- |
| Signature | Mandatory | New parameter: Signature using the RSA-PSS algorithm on the Device Hello message up to and excluding the Signature parameter, signed by one of the device's AIK private keys for which the RI has pre-acquired the public key. |

Modification of the RI Hello Message and its Derivation

A first modification is to add a new RI TPM Capability Indication (RTCI), which is an indicator of the RI's TPM capability either as a new element of the existing Extension parameter of the RI Hello message, or alternatively and preferably, add the RTCI as a new first parameter in the header of the RI Hello message. The benefit of this modification is that it allows the device to use the RTCI information to evaluate the trustworthiness of the RI and to utilize such information in its further interaction with the RI in the remainder of the ROAP protocol procedures.

A second modification is to use the RI TPM to provide a pseudo-random number for the session ID. The benefit of this modification is that the TPM provides a highly secure hardware-based pseudo-random number generator. Using the TPM to generate a pseudo-random number that is used as the session ID strengthens the security of the protocol.

A third modification is to use the RI TCG EK credential or the TCG AIK credential belonging to the RI's TPM to derive the RI ID. The benefit of this modification is that the EK credential and/or the AIK credential is highly protected by the TPM inside the device and deriving the DRM device ID from either of these credentials strengthens the integrity of the DRM device ID information.

A fourth modification is to use the RI TPM to provide the RI nonce. The benefit of this modification is that the TPM provides a highly secure hardware-based pseudo-random number generator. Using the TPM to generate the RI nonce strengthens the integrity of the nonce that is used in the RI Hello message.

A fifth modification is to include the device TCG credentials in the device trusted RI anchor. The device's TCG credentials include the EK credential, the AIK credential, the platform credential, and the compliance credentials that the RI has pre-acquired from a trusted TCG CA. The benefit of this modification is to enhance the trust that the device can have on the RI Hello message.

A sixth modification is to add a signature of the RI Hello message up to and excluding the signature signed with RI's AIK private key, where the RI's AIK public key has been previously distributed to the device as part of the RI Hello message. The benefit of this modification is to protect the integrity of the RTCI from the first interaction between the RI and the device. Using the RI's AIK private key, which is highly securely protected by the RI's TPM, strengthens the integrity of the signing operation.

Tables 14 and 15 show two possible formats for the modified RI Hello message. Table 14 shows the format of the RI Hello message with the RTCI bit as the first parameter. Table 15 shows the format of the RI Hello message where the RTCI is a new element of the existing Extension parameter.

TABLE 14

Modified RI Hello message format

ROAP-RI Hello

| Parameter | Status = "Success" | Status not "Success" | Notes (Changes from OMA DRM 2.0 RI Hello message) |
| --- | --- | --- | --- |
| RI TPM Capability Indicator (RTCI) | Optional | Optional | New Parameter: Either a 1-bit indicator (for absence or presence of an RI TPM) or more bits indicating more granular information about the RI TPM capability. |
| Status | Mandatory | Mandatory | Unchanged. |
| Session ID | Mandatory | — | Unchanged in format, but generated by the RI's TPM. |
| Selected Version | Mandatory | — | Unchanged. |
| RI ID | Mandatory | — | Unchanged in format but uses the SHA-1 hash generated by the RI's TPM of either the RI TPM EK credential or one of the RI TPM AIK credentials, using the RSA-PSS method supported by the OMA DRM 2.0 ROAP. |
| Selected Algorithm | Optional | — | Unchanged. |
| RI Nonce | Mandatory | — | Unchanged in format, but to be generated by the RI TPM if the RI TPM exists. |
| Trusted device Authorities | Optional | — | List of device trust anchors recognized by the RI. The proposed modification includes the device's TCG credential(s) as part of the list of trust anchors. |

TABLE 14-continued

Modified RI Hello message format

ROAP-RI Hello

| Parameter | Status = "Success" | Status not "Success" | Notes (Changes from OMA DRM 2.0 RI Hello message) |
|---|---|---|---|
| Server Info | Optional | — | Unchanged. |
| Extensions | Optional | — | Unchanged. |
| Signature | Mandatory | Mandatory | New parameter: Computed using the RSA-PSS algorithm on the RI Hello message up to and excluding the Signature parameter, signed by one of the RI AIK private keys for which the device has pre-acquired the public key. The Signature is mandatory regardless of the success or failure of the Device Hello message. |

TABLE 15

Modified RI Hello message format

ROAP-RI Hello

| Parameter | Status = "Success" | Status not "Success" | Notes (Changes from OMA DRM 2.0 RI Hello) |
|---|---|---|---|
| Status | Mandatory | Mandatory | Unchanged. |
| Session ID | Mandatory | — | Unchanged in format, but generated by the RI's TPM. |
| Selected Version | Mandatory | — | Unchanged. |
| RI ID | Mandatory | — | Unchanged in format but uses the SHA-1 hash computed by the RI's TPM of either the RI TPM EK credential or one of the RI TPM AIK credentials, using the RSA-PSS method supported by the OMA DRM 2.0 ROAP. |
| Selected Algorithm | Optional | — | Unchanged. |
| RI Nonce | Mandatory | — | Unchanged in format, but to be generated by the RI TPM if the RI TPM exists. |
| Trusted device Authorities | Optional | — | List of device trust anchors recognized by the RI. Proposed modification has additional inclusion of the device's TCG credential(s) as part of the list of the trust anchors. |
| Server Info | Optional | — | Unchanged. |
| Extensions | Optional | — | All of the OMA DRM 2.0 ROAP RI Hello Extensions elements, plus a new RI TPM Capability Indicator (RTCI) element consisting of one or more bits indicating the RI's TPM Capability. |
| Signature | Mandatory | Mandatory | New parameter: Computed using the RSA-PSS algorithm on the RI Hello message up to and excluding the Signature parameter, signed by one of the RI AIK private keys for which the device has pre-acquired the public key. Also, make the signature mandatory regardless of the success or failure of the Device Hello. |

Modification to the Registration Request Message and its Derivation

A first modification is to use the device TPM to provide the device nonce. The benefit of this modification is that the TPM provides a secure and reliable pseudo-random number suitable for use for the nonce.

A second modification is to include the device TCG credentials in the certificate chain. Including the device TCG credentials can be either in replacement of, or in addition to, the existing OMA DRM 2.0 device credentials. The benefit of including the TCG credentials (such as the EK credential, AIK credentials, platform credential, or the compliance credential) is to add to the trustworthiness of the device.

A third modification is to include a list of the TCG CAs trusted by the RI in the trusted RI anchor element. Including the TCG CA's trusted by the RI can be either in replacement of, or in addition to, the existing OMA DRM 2.0 RI trusted anchor element lists. The benefit of including the list of the TCG CAs trusted by the RI is to add to the trustworthiness of the device.

A fourth modification is to include information about the device TPM in the Device Details element of the Extensions parameter. The benefit of including this information is to enhance the trustworthiness about the device to the RI.

A fifth modification is to sign the Signature with the device AIK used to sign the modified Device Hello message. The benefit of this modification is to add to the trustworthiness of the device and the Registration Request message due to the highly protected nature of the device AIK.

Table 16 shows the format for the modified Registration Request message.

TABLE 16

Modified Registration Request message format

| Parameter | Registration Request | Notes (Changes from the OMA DRM 2.0 ROAP Registration Request message) |
|---|---|---|
| Session ID | Mandatory | Unchanged. |
| Device Nonce | Mandatory | Unchanged in format, but provided by the device TPM. |
| Request Time | Mandatory | Unchanged. |
| Certificate Chain | Optional | Unchanged in format but listing TCG certificates only, or changed in format listing both the OMA DRM certificates and the TCG certificates. |
| Trusted RI Authorities | Optional | Unchanged in format but listing information on TCG CA authorities as RI trust anchors only, or changed in format listing both the OMA DRM RI trust anchors and the TCG CA authorities as additional RI trust anchors. |
| Server Info | Optional | Unchanged. |
| Extensions | Optional | All the existing OMA DRM 2.0 Registration Request Extensions elements. However, if the device has a TPM then information on device's TPM (such as manufacturer name, version, etc.) should be included in the Device Details element. |
| Signature | Mandatory | Unchanged in format, but using device TPMs AIK used in signing the modified Device Hello message. |

Modification of the Registration Response Message and its Derivation

A first modification is to use the RI TPM to provide a pseudo-random number for the session ID. The benefit of this modification is that the TPM provides a highly secure hardware-based pseudo-random number generator. Using the TPM to generate a pseudo-random number that is used as the session ID strengthens the security of the protocol.

A second modification is to use the RI TCG EK credential or the TCG AIK credential belonging to the RI's TPM to derive the RI ID. The benefit of this modification is that the EK credential and/or the AIK credential is highly protected by the TPM inside the device and deriving the DRM device ID from either of these credentials strengthens the integrity of the DRM device ID information.

A third modification is to use the RI TPM to provide the RI nonce. The benefit of this modification is that the RI TPM provides a secure and reliable pseudo-random number suitable for use as the nonce.

A fourth modification is to include a list of the TCG CAs trusted by the device in the trusted device anchor element. Including the TCG CAs trusted by the device can be either in replacement of, or in addition to, the existing OMA DRM 2.0 trusted device anchor element lists. The benefit of including the list of the TCG CAs trusted by the device is to add to the trustworthiness of the RI.

A fifth modification is to sign the Signature with the RI AIK used to sign the modified RI Hello message. The benefit of this modification is to add to the trustworthiness of the RI and the Registration Response message due to the highly protected nature of the RI AIK.

Table 17 shows the format for the modified Registration Response message.

TABLE 17

Modified Registration Response message format

| Parameter | Registration Response Status = "Success" | Status not "Success" | Notes (Changes from the OMADRM 2.0 ROAP Registration Response message) |
|---|---|---|---|
| Status | Mandatory | Mandatory | Unchanged. |
| Session ID | Mandatory | — | Unchanged in format, but use the pseudo-random number generated by the RI's TPM. |
| Selected Version | Mandatory | — | Unchanged. |
| RI ID | Mandatory | — | Unchanged in format, but use the SHA-1 hash computed by the RI TPM of either the RI TPM's EK credential or one of the AIK credentials. |
| Selected Algo. | Mandatory | — | Unchanged. |
| RI Nonce | Mandatory | — | Unchanged in format, but use the nonce generated by the RI TPM. |
| Trusted device Authorities | Optional | — | Unchanged in format but listing only the information on TCG CA authorities that the device trusts as the trust anchors, or changed in format listing both the OMA DRM device trust anchors and the TCG CA authorities trusted by the device as additional device trust anchors. |
| Server Info | Optional | — | Unchanged. |
| Extensions | Optional | — | Unchanged. |

TABLE 17-continued

Modified Registration Response message format

Registration Response

| Parameter | Status = "Success" | Status not "Success" | Notes (Changes from the OMADRM 2.0 ROAP Registration Response message) |
|---|---|---|---|
| Signature | Mandatory | Mandatory | Unchanged in format, but sign with the same RI TPM AIK that was used in signing the modified RI Hello message. The Signature is mandatory regardless of the success or failure of the Registration Request message. |

Modification of the RO Request Message and its Derivation

A first modification is to use the TPM to create the SHA-1 hash of a selected TCG credential (an EK credential, an AIK credential, a platform credential, or a compliance credential) to use as the device ID. The benefit of this modification is that the credentials are highly protected by the TPM, and thus, deriving the device ID from one of these credentials strengthens the integrity of the device ID information.

A second modification is to use the device TPM to generate the device nonce. The benefit of this modification is that a nonce generated by the TPM is secure, due to the TPM's protected pseudo-random number generation capability.

A third modification is to include the device TCG credentials in the certificate chain. Including the TCG credentials can be either in replacement of, or in addition to, the existing OMA DRM 2.0 device credentials. The benefit of including the TCG credentials is to add to the trustworthiness of the device.

A fourth modification is to sign the optional DCF Hash with a device AIK in the Extension parameter. The benefit of this modification is that the device AIKs are highly protected, thereby making the DCF signature more secure.

A fifth modification is to sign the RO Request message with the device AIK used to sign the most recent successfully responded to Registration Request message. The benefit of this modification is to add to the trustworthiness of the RI and the RO Request message due to the highly protected nature of the RI AIK.

Table 18 depicts the format of the modified RO Request message.

TABLE 18

Modified RO Request message format

| Parameter | ROAP-RO Request Mandatory/ Optional | Notes |
|---|---|---|
| Device ID | M | Unchanged in format but use the TPM to compute the SHA-1 hash of a TCG credential to use as the device ID. |
| Domain ID | O | Unchanged. |
| RI ID | M | Unchanged. |
| Device Nonce | M | Unchanged in format but use the nonce generated by the device TPM. |
| Request Time | M | Unchanged. |
| RO Info | M | Unchanged. |
| Certificate Chain | O | Use either the device TCG certificate chain or both the OMA DRM 2.0 certificate chain plus the device TCG certificate chain. |
| Extensions | O | Unchanged in format, but when a DCF signature is included, sign the DCF with an RI AIK. |
| Signature | M | Unchanged in format, but use the TPM to compute the signature using the device AIK used to sign the most recent successfully responded to Registration Request message. |

Modification of the RO Response Message and its Derivation

One modification is to use the RI's TPM to sign the RO Response message with the same RI TPM AIK used in signing the most recent successful Registration Response message. The benefit of this modification is to add to the trustworthiness of the RI and the RO Response message due to the highly protected nature of the RI AIK.

Table 19 depicts the format of modified RO Request message.

TABLE 19

Modified RO Response message format

| Parameter | 2-Pass Successful | 2-Pass not Successful | Notes |
|---|---|---|---|
| Status | M | M | Unchanged. |
| Device ID | M | — | Unchanged. |
| RI ID | M | — | Unchanged. |
| Device Nonce | M | — | Unchanged. |
| Protected ROs | M | — | Unchanged. |

TABLE 19-continued

Modified RO Response message format

| Parameter | 2-Pass Successful | 2-Pass not Successful | Notes |
|---|---|---|---|
| Cert. Chain | O | — | Unchanged. |
| OCSP Response | O | — | Unchanged. |
| Extensions | O | — | Unchanged. |
| Signature | M | M | Unchanged in format but use the RI TPM to sign with the RI AIK used in the most recent successful Registration Response message. The Signature is mandatory regardless of the success or failure of the RO Request message. |

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method for integrity protection of information used in protocol messages exchanged between two entities in a protocol that enables one entity to acquire a rights object from the other entity, comprising, by at least one of the entities:

securely storing information to be used in the protocol messages using a protected module of the entity, wherein the storing comprises sealed signing of the information using, in part, information indicative of an integrity status of the platform on which the entity operates or software components thereof, and wherein the storing further comprises binding the information by encrypting the information with a key protected by the protected module; and pre-verifying the sealed signed information to be used in the protocol messages prior to the use thereof by the entity.

2. The method according to claim 1, wherein the sealed-signing comprises:

symmetrically encrypting the information with a symmetric encryption key; and asymmetrically signing the symmetric encryption key and the information that indicates the integrity status of the platform on which the entity operates or software components thereof.

3. The method according to claim 1, wherein the encrypting comprises asymmetrically encrypting the information.

4. The method according to claim 1, wherein the protected module is a trusted processing module (TPM).

5. The method according to claim 4, wherein the TPM is used to derive parameters to use in the protocol messages.

6. The method according to claim 1, wherein the information is selected from the group consisting of: a device identification, a rights issuer identification, a certificate, a certificate chain, a digital rights management related time value, a rights object, an algorithm, and a nonce.

7. The method according to claim 1, wherein the method is applied to all protocol messages used by the entity.

8. The method according to claim 1, wherein the method is integrated into the generation and transmission of the protocol messages.

9. The method according to claim 1, further comprising adding a field to existing protocol messages to indicate a trusted computing capability of the entity.

10. The method according to claim 1, wherein the protocol comprises a rights object acquisition protocol (ROAP).

11. An entity comprising a processor and a memory and coupled to a communication network, the memory storing computer-executable instructions, which when executed by the processor, enable the entity to protect the integrity of information used in an exchange of messages between the entity and another entity on the network in accordance with a protocol that enables one entity to acquire a rights object from the other entity, the instructions further causing the entity to perform acts comprising:

securely storing information to be used in the protocol messages using a protected module of the entity, wherein the storing comprises sealed signing of the information using, in part, information indicative of an integrity status of the platform on which the entity operates or software components thereof, and wherein the storing further comprises binding the information by encrypting the information with a key protected by the protected module; and pre-verifying the sealed signed information to be used in the protocol messages prior to the use thereof by the entity.

12. The entity recited in claim 11, wherein the sealed-signing comprises:

symmetrically encrypting the information with a symmetric encryption key; and asymmetrically signing the symmetric encryption key and the information that indicates the integrity status of the platform on which the entity operates or software components thereof.

13. The entity recited in claim 11, wherein the encrypting comprises asymmetrically encrypting the information.

14. The entity recited in claim 11, wherein the protected module is a trusted processing module (TPM).

15. The entity recited in claim 14, wherein the TPM is used to derive parameters to use in the protocol messages.

16. The entity recited in claim 11, wherein the information is selected from the group consisting of: a device identification, a rights issuer identification, a certificate, a certificate chain, a digital rights management related time value, a rights object, an algorithm, and a nonce.

17. The entity recited in claim 11, wherein the method is applied to all protocol messages used by the entity.

18. The entity recited in claim 11, wherein the method is integrated into the generation and transmission of the protocol messages.

19. The entity recited in claim 11, further comprising adding a field to existing protocol messages to indicate a trusted computing capability of the entity.

20. The entity recited in claim 11, wherein the protocol comprises a rights object acquisition protocol (ROAP).

21. The method according to claim 1, wherein the binding further comprises signing the information with the key protected by the protected module.

22. The entity recited in claim 11, wherein the binding further comprises signing the information with the key protected by the protected module.

* * * * *